(12) United States Patent
Henley et al.

(10) Patent No.: US 12,072,295 B1
(45) Date of Patent: Aug. 27, 2024

(54) GEMSTONE INSCRIPTION VIEWING SYSTEM AND APPLICATIONS THEREOF

(71) Applicant: OPSYDIA LIMITED, Begbroke (GB)

(72) Inventors: Simon Henley, London (GB); Lewis Fish, Oxford (GB); Ajay Varghese, Oxford (GB); Joseph Dixon, Oxford (GB); Matthew Ashdale, London (GB); Patrick Salter, Twyford (GB); Martin Booth, Oxford (GB)

(73) Assignee: OPSYDIA LIMITED, Begbroke (GB)

( * ) Notice: Subject to any disclaimer, the term of this patent is extended or adjusted under 35 U.S.C. 154(b) by 0 days.

(21) Appl. No.: 18/513,086

(22) Filed: Nov. 17, 2023

Related U.S. Application Data

(60) Provisional application No. 63/587,604, filed on Oct. 3, 2023.

(51) Int. Cl.
  *G01N 21/87* (2006.01)
  *G02B 25/00* (2006.01)
  *G02B 25/02* (2006.01)

(52) U.S. Cl.
  CPC ........... *G01N 21/87* (2013.01); *G02B 25/002* (2013.01); *G02B 25/02* (2013.01)

(58) Field of Classification Search
  CPC ............... G01N 21/87; G01N 2800/52; G01N 21/6428; G01N 33/6893; G01N 21/8806; G01N 21/8851; G01N 21/01; G01N 21/65; G01N 33/574; G01N 33/68; G01N 21/552; G01N 33/6896; G01N 21/64; G01N 33/582; G01N 2500/00; G01N 33/53; G01N 21/88; G01N 27/308; G01N 2500/10; G01N 33/5011; G01N 2500/04; G01N 21/31;
  (Continued)

(56) References Cited

U.S. PATENT DOCUMENTS 8,035,807 B2 * 10/2011 Wagner ................... G02B 25/02
  356/30
10,522,002 B2 * 12/2019 Wilkinson .......... G07F 17/3248
(Continued)

FOREIGN PATENT DOCUMENTS

CN     115839954 A  *  3/2023
GB      2590947 A   *  7/2021  ............. G01N 21/87
(Continued)

*Primary Examiner* — Michael P Stafira
(74) *Attorney, Agent, or Firm* — Sterne, Kessler, Goldstein & Fox P.L.L.C.

(57) ABSTRACT

A viewing device is configured to magnify and view a marking on a gemstone. The viewing device includes a light source, a mask, a magnifying optical device, and a camera. The light source generates light directed along a first path towards the gemstone. The mask partially obscures the light from the light source to generate a pattern. The partially obscured light is reflected off of the gemstone and magnified by the magnifying optical device. The camera is positioned to capture the magnified light. One or more additional light sources generate light directed along a second path towards the gemstone. The light enters the gemstone through a preferred facet and internally reflects. Internally reflected light scatters off of an internal mark in the gemstone and exits the gemstone through the gemstone's top face. The reflected and scattered light is magnified by the magnifying optical device and captured by the camera.

23 Claims, 10 Drawing Sheets

(58) Field of Classification Search
CPC .... G01N 33/56983; G01N 21/84; G01N 3/42;
G01N 21/9501; G01N 1/286; G01N
33/6854; G01N 33/54373; G01N
33/54366; G01N 21/6458; G01N 21/85;
G01N 33/5438; G01N 33/5008; G01N
33/381; G01N 33/57492; G01N
2015/1006; G01N 2021/8887; G01N
1/32; G01N 2021/6439; G01N 33/564;
G01N 21/6456; G01N 21/95; G01N
33/573; G01N 21/3563; G01N 33/57484;
G01N 15/1433; G01N 33/566; G01N
21/6452; G01N 21/35; G01N 33/5308;
G01N 2201/06113; G01N 21/05; G01N
33/5005; G01N 21/3577; G01N 21/956;
G01N 23/04; G01N 33/543; G01N
2021/3595; G01N 2201/062; G01N
21/6486; G01N 33/5091; G01N 33/24;
G01N 33/54393; G01N 33/50; G01N
33/74; G01N 33/6872; G01N 21/359;
G01N 21/658; G01N 21/645; G01N
33/505; G01N 1/28; G01N 15/1459;
G01N 33/48; G01N 2500/02; G01N
21/55; G01N 2800/2821; G01N 33/6848;
G01N 33/56972; G01N 33/48721; G01N
33/92; G01N 33/542; G01N 21/274;
G01N 21/25; G01N 2800/50; G01N 3/08;
G01N 33/49; G01N 24/10; G01N
21/0303; G01N 27/4145; G01N 33/86;
G01N 27/3272; G01N 27/44791; G01N
33/6803; G01N 15/149; G01N 21/78;
G01N 21/958; G01N 21/3504; G01N
33/54306; G01N 33/56966; G01N
21/255; G01N 23/223; G01N 1/30; G01N
33/54386; G01N 1/06; G01N 23/046;
G01N 27/30; G01N 33/502; G01N
33/54326; G01N 21/21; G01N 2800/24;
G01N 33/56911; G01N 27/48; G01N
21/76; G01N 21/94; G01N 21/33; G01N
33/66; G01N 30/02; G01N 33/54313;
G01N 2021/6441; G01N 21/59; G01N
2201/0221; G01N 21/648; G01N 21/27;
G01N 21/6408; G01N 33/54353; G01N
33/57407; G01N 33/6845; G01N 27/327;
G01N 21/00; G01N 35/0099; G01N
35/10; G01N 2021/6421; G01N 21/47;
G01N 2201/08; G01N 2021/0346; G01N
2333/705; G01N 33/5088; G01N 21/17;
G01N 1/34; G01N 27/3274; G01N
15/1434; G01N 33/6863; G01N
2001/2873; G01N 33/5047; G01N
2201/12; G01N 2800/042; G01N 1/36;
G01N 23/2251; G01N 33/487; G01N
33/5044; G01N 21/253; G01N 15/01;
G01N 33/6842; G01N 29/022; G01N
15/1404; G01N 2333/70596; G01N
33/5023; G01N 3/02; G01N 2333/726;
G01N 33/533; G01N 25/72; G01N
27/3277; G01N 27/3278; G01N 33/15;
G01N 21/211; G01N 2333/47; G01N
21/6489; G01N 24/08; G01N 27/26;
G01N 21/9508; G01N 2201/061; G01N
2203/0647; G01N 2021/845; G01N
2800/56; G01N 33/54346; G01N
2021/0112; G01N 31/22; G01N 33/2823;
G01N 21/03; G01N 21/954; G01N
27/447; G01N 35/00732; G01N
2223/076; G01N 27/4146; G01N 33/58;
G01N 2800/26; G01N 33/57415; G01N
30/6095; G01N 21/952; G01N 33/18;
G01N 29/036; G01N 33/558; G01N
2021/6432; G01N 33/52; G01N 3/56;
G01N 23/207; G01N 21/9515; G01N
35/0098; G01N 2203/0286; G01N
23/083; G01N 27/414; G01N 33/57438;
G01N 2291/0256; G01N 1/312; G01N
1/44; G01N 27/3271; G01N 33/6887;
G01N 2001/2866; G01N 15/147; G01N
33/84; G01N 35/028; G01N 33/57423;
G01N 27/302; G01N 15/06; G01N
2015/1497; G01N 2035/00237; G01N
35/00; G01N 35/00029; G01N 21/896;
G01N 21/89; G01N 27/416; G01N
33/4833; G01N 2021/6484; G01N
33/569; G01N 2035/00495; G01N
2015/1486; G01N 2035/00326; G01N
35/1065; G01N 33/80; G01N 35/0092;
G01N 27/4148; G01N 2021/8825; G01N
2015/0288; G01N 21/39; G01N
2021/646; G01N 21/636; G01N 15/042;
G01N 15/05; G01N 21/51; G01N 15/14;
G01N 2021/399; G01N 2201/129; G01N
1/4077; G01N 2001/4083; G01N
35/00871; G01N 2015/016; G01N 33/02;
G01N 2015/1028; G01N 21/474; G01N
2333/575; G01N 2333/62; G01N
2333/91188; G01N 2333/96463; G01N
33/743; G01N 33/82; G01N 30/0005;
G01N 33/442; G01N 35/026; G01N
15/1484; G01N 2021/1793; G01N 21/57;
G01N 35/1072; G01N 2015/012; G01N
33/025; G01N 33/57426; G01N 21/9503;
G01N 33/4915; G01N 33/5094; G01N
35/04; G01N 15/10; G01N 15/1468;
G01N 2035/00138; G01N 2015/0053;
G01N 2015/1493; G01N 35/1011; G01N
15/0227; G01N 2015/047; G01N
2035/00306; G01N 2035/0449; G01N
21/554; G01N 2570/00; G01N 35/00069;
G01N 15/0205; G01N 2035/00356; G01N
2035/00366; G01N 2035/00425; G01N
2035/0486; G01N 2035/0491; G01N
2035/0493; G01N 2035/1037; G01N
2201/024; G01N 2201/04; G01N
35/1009; G01N 15/0255; G01N
2035/00148; G01N 2035/00435; G01N
2035/00633; G01N 2035/0474; G01N
2035/0494; G01N 21/553; G01N 33/62;
G01N 33/6827; G01N 35/00623; G01N
2015/1415; G01N 2030/027; G01N
2030/162; G01N 2030/285; G01N
2030/383; G01N 2030/8435; G01N
2035/1076; G01N 2201/0612; G01N
27/44743; G01N 30/16; G01N 31/229;
G01N 15/04; G01N 15/0631; G01N
15/0656; G01N 2015/0233; G01N
2015/035; G01N 2015/045; G01N
2015/1016; G01N 23/225; G01N
2458/00; G01N 27/44756; G01N 33/491;
G01N 15/1456; G01N 2035/1051; G01N 27/227; G01N 33/5302; G01N 2035/00881; G01N 2021/6471; G01N 2015/0238; G01N 2333/916; G01N 33/5041; G01N 33/57434; G01N 2021/7793; G01N 2035/1034; G01N 27/4473; G01N 31/224; G01N 33/5058; G01N 1/40; G01N 2021/7723; G01N 2469/10; G01N 33/57419; G01N 33/6818; G01N 15/1429; G01N 2021/335; G01N 2021/3513; G01N 1/405; G01N 2015/1406; G01N 21/45; G01N 21/63; G01N 21/6454; G01N 21/774; G01N 2333/71; G01N 2333/924; G01N 33/5073; G01N 35/08; G01N 2035/00158; G01N 21/95607; G01N 2440/14; G01N 27/44721; G01N 30/00; G01N 33/48707; G01N 33/54388; G01N 33/54391; G01N 1/31; G01N 2021/058; G01N 2021/3137; G01N 21/251; G01N 23/2204; G01N 2333/91205; G01N 2333/96466; G01N 33/531; G01N 2021/6417; G01N 2035/00059; G01N 2035/00455; G01N 2035/00534; G01N 21/07; G01N 21/7703; G01N 2201/068; G01N 2291/0423; G01N 33/56905; G01N 35/1074; G01N 35/109; G01N 19/00; G01N 2015/144; G01N 21/272; G01N 2203/0082; G01N 2333/11; G01N 2405/00; G01N 27/226; G01N 33/523; G01N 33/5304; G01N 33/6824; G01N 2015/0687; G01N 2015/1472; G01N 2015/1488; G01N 2030/025; G01N 21/6402; G01N 2201/0214; G01N 2201/0216; G01N 2201/0691; G01N 2333/00; G01N 27/00; G01N 27/44782; G01N 30/6069; G01N 33/526; G01N 33/577; G01N 35/025; G01N 15/0612; G01N 2015/1481; G01N 2021/4747; G01N 2021/7726; G01N 21/783; G01N 2291/106; G01N 27/27; G01N 2800/102; G01N 2800/104; G01N 2800/2835; G01N 1/2202; G01N 2021/4709; G01N 2021/7779; G01N 2021/888; G01N 2027/222; G01N 2030/8813; G01N 2035/00277; G01N 2035/103; G01N 2333/195; G01N 2333/70589; G01N 2333/9015; G01N 2469/20; G01N 27/048; G01N 27/223; G01N 2800/22; G01N 29/222; G01N 33/536; G01N 2021/656; G01N 2035/0094; G01N 21/75; G01N 21/7743; G01N 21/9506; G01N 21/95684; G01N 2201/0635; G01N 2201/0636; G01N 2223/05; G01N 2333/32; G01N 2333/4737; G01N 2333/485; G01N 2333/525; G01N 2333/5412; G01N 2333/90241; G01N 2333/91215; G01N 27/44708; G01N 29/22; G01N 29/2418; G01N 30/32; G01N 33/5055; G01N 33/551; G01N 33/5748; G01N 2021/479; G01N 2021/6419; G01N 2021/7773; G01N 2021/8874; G01N 2021/95676; G01N 21/8901; G01N 2291/0255; G01N 23/041; G01N 23/2055; G01N 2333/183; G01N 2333/245; G01N 2333/31; G01N 2333/33; G01N 27/225; G01N 2800/245; G01N 2800/60; G01N 2800/70; G01N 33/5052; G01N 33/552; G01N 33/5761; G01N 33/5767; G01N 33/585; G01N 33/587; G01N 33/60; G01N 33/9493; G01N 1/2813; G01N 15/1031; G01N 2001/2223; G01N 2001/2893; G01N 2015/018; G01N 2015/055; G01N 2015/1413; G01N 2021/6482; G01N 2021/8854; G01N 2030/324; G01N 2030/685; G01N 21/3518; G01N 21/3586; G01N 21/6445; G01N 21/66; G01N 21/8803; G01N 2201/103; G01N 2223/611; G01N 2333/44; G01N 2510/00; G01N 27/127; G01N 27/3276; G01N 30/88; G01N 33/5014; G01N 33/5076; G01N 33/525; G01N 33/56916; G01N 33/56938; G01N 33/56988; G01N 33/57449; G01N 33/57496; G01N 35/02; G02B 27/0172; G02B 2027/0138; G02B 27/017; G02B 2027/0178; G02B 2027/014; G02B 1/14; G02B 27/0093; G02B 2027/0187; G02B 5/30; G02B 27/646; G02B 1/04; G02B 5/20; G02B 5/208; G02B 6/0038; G02B 6/0053; G02B 1/11; G02B 1/10; G02B 5/3083; G02B 6/0036; G02B 5/124; G02B 5/045; G02B 27/0101; G02B 6/0065; G02B 7/09; G02B 5/201; G02B 7/08; G02B 5/0278; G02B 27/0176; G02B 6/0068; G02B 1/115; G02B 5/223; G02B 3/0056; G02B 30/27; G02B 1/111; G02B 1/18; G02B 6/25; G02B 5/02; G02B 7/021; G02B 27/01; G02B 1/02; G02B 13/0045; G02B 7/02; G02B 6/0055; G02B 6/4214; G02B 2027/0118; G02B 27/0006; G02B 1/041; G02B 6/005; G02B 3/08; G02B 3/00; G02B 26/0833; G02B 5/04; G02B 1/118; G02B 2027/0134; G02B 5/08; G02B 6/00; G02B 6/0051; G02B 5/0242; G02B 6/1225; G02B 13/06; G02B 5/22; G02B 5/3033; G02B 6/0073; G02B 13/18; G02B 6/0061; G02B 13/0065; G02B 1/043; G02B 5/23; G02B 3/14; G02B 7/04; G02B 19/0028; G02B 3/0031; G02B 27/0179; G02B 27/283; G02B 5/0221; G02B 6/0031; G02B 5/3025; G02B 5/1857; G02B 5/305; G02B 6/122; G02B 6/262; G02B 2027/0123; G02B 6/4204; G02B 5/003; G02B 21/367; G02B 6/32; G02B 21/361; G02B 6/43; G02B 2027/0141; G02B 7/102; G02B 5/0268; G02B 5/1861; G02B 6/3885; G02B 5/0231; G02B 13/001; G02B 27/286; G02B 6/12004; G02B 21/365; G02B 26/0841; G02B 5/32; G02B 5/3016; G02B 6/0043; G02B 27/0025; G02B 6/4249; G02B 5/18; G02B 21/16; G02B 6/30; G02B 5/285; G02B 27/0081; G02B 3/005; G02B 1/12; G02B 6/136; G02B 6/0028; G02B 6/0021; G02B 13/0015; G02B 6/13; G02B 26/0816; G02B 26/101; G02B 5/0294; G02B 2027/011; G02B 6/0016; G02B 6/4206; G02B 5/1876; G02B 27/30; G02B 5/1852; G02B 6/0018; G02B 6/3863; G02B 13/009; G02B 2027/0174; G02B 21/06; G02B 7/023; G02B 5/3041; G02B 26/001; G02B 26/02; G02B 1/113; G02B 5/3058; G02B 26/105; G02B 6/42; G02B 19/0061; G02B 27/141; G02B 6/10; G02B 27/144; G02B 6/34; G02B 5/0891; G02B 6/3636; G02B 6/3652; G02B 21/34; G02B 21/26; G02B 6/0076; G02B 6/4246; G02B 5/0215; G02B 26/10; G02B 5/0226; G02B 23/2484; G02B 27/0075; G02B 13/0085; G02B 27/0927; G02B 3/0087; G02B 6/0001; G02B 5/1814; G02B 6/3893; G02B 21/0076; G02B 27/0018; G02B 13/02; G02B 6/002; G02B 6/3861; G02B 5/1866; G02B 3/0062; G02B 5/0808; G02B 27/145; G02B 5/10; G02B 7/28; G02B 27/1066; G02B 6/3825; G02B 6/02395; G02B 21/0032; G02B 6/0008; G02B 27/1006; G02B 6/0035; G02B 6/124; G02B 2207/101; G02B 5/0284; G02B 13/14; G02B 6/006; G02B 1/002; G02B 7/36; G02B 6/4292; G02B 27/0994; G02B 6/0046; G02B 6/0023; G02B 30/00; G02B 6/0025; G02B 7/022; G02B 27/0955; G02B 3/0043; G02B 7/182; G02B 3/0012; G02B 2027/0112; G02B 5/00; G02B 27/0905; G02B 3/0006; G02B 6/3839; G02B 2027/013; G02B 3/0068; G02B 6/3821; G02B 19/0014; G02B 5/26; G02B 26/004; G02B 19/0066; G02B 7/003; G02B 5/005; G02B 27/28; G02B 21/002; G02B 6/02; G02B 5/008; G02B 2027/0127; G02B 26/08; G02B 27/0012; G02B 6/4296; G02B 6/0056; G02B 6/423; G02B 5/1847; G02B 6/1221; G02B 1/00; G02B 5/09; G02B 26/005; G02B 5/021; G02B 2027/0147; G02B 3/0075; G02B 2027/0194; G02B 27/10; G02B 27/1033; G02B 21/32; G02B 6/0088; G02B 2027/015; G02B 27/14; G02B 27/0181; G02B 2027/0152; G02B 2027/012; G02B 26/023; G02B 2027/0198; G02B 2027/0116; G02B 6/003; G02B 30/34; G02B 6/0011; G02B 5/1809; G02B 2027/0159; G02B 27/4272; G02B 5/28; G02B 2027/0169; G02B 30/25; G02B 13/22; G02B 2027/0156; G02B 2027/0185; G02B 13/006; G02B 27/00; G02B 26/00; G02B 6/009; G02B 3/0025; G02B 6/0085; G02B 13/0025; G02B 27/0037; G02B 6/4221; G02B 27/4222; G02B 5/1842; G02B 27/4211; G02B 5/085; G02B 6/0075; G02B 13/0035; G02B 2027/0154; G02B 26/0808; G02B 27/0966; G02B 27/123; G02B 27/281; G02B 5/283; G02B 6/0078; G02B 27/0944; G02B 5/1871; G02B 6/4239; G02B 1/005; G02B 26/04; G02B 27/0961; G02B 27/0977; G02B 3/0018; G02B 30/26; G02B 6/4298; G02B 19/0047; G02B 2027/0125; G02B 2027/0132; G02B 21/0028; G02B 27/0149; G02B 27/32; G02B 6/2706; G02B 6/428; G02B 2005/1804; G02B 21/02; G02B 27/0189; G02B 6/327; G02B 27/142; G02B 3/04; G02B 30/33; G02B 30/52; G02B 5/0875; G02B 5/204; G02B 6/4245; G02B 7/025; G02B 2006/12102; G02B 30/36; G02B 5/1819; G02B 5/188; G02B 6/02033; G02B 6/02042; G02B 6/3616; G02B 6/3628; G02B 6/3672; G02B 6/4207; G02B 6/4224; G02B 6/424; G02B 6/4403; G02B 6/448; G02B 6/4482; G02B 7/008; G02B 9/04; G02B 13/004; G02B 17/08; G02B 21/008; G02B 27/0068; G02B 27/18; G02B 27/4205; G02B 6/1245; G02B 6/362; G02B 6/3676; G02B 6/3692; G02B 2006/12107; G02B 2006/12135; G02B 2027/0121; G02B 21/0052; G02B 27/4261; G02B 27/48; G02B 30/10; G02B 5/1828; G02B 5/3008; G02B 6/0005; G02B 17/008; G02B 21/0064; G02B 26/0875; G02B 27/09; G02B 27/0972; G02B 27/4233; G02B 5/288; G02B 17/0892; G02B 21/086; G02B 21/10; G02B 21/18; G02B 21/22; G02B 21/241; G02B 26/007; G02B 30/28; G02B 6/0095; G02B 7/38; G02B 2006/12121; G02B 26/026; G02B 27/0916; G02B 27/106; G02B 27/46; G02B 27/62; G02B 30/29; G02B 30/30; G02B 30/40; G02B 5/122; G02B 6/0015; G02B 6/0081; G02B 6/107; G02B 6/125; G02B 6/4212; G02B 7/006; G02B 9/12; G02B 13/003; G02B 13/005; G02B 17/0896; G02B 19/0071; G02B 2006/1215; G02B 2006/12183; G02B 2027/0105; G02B 21/0012; G02B 27/1086; G02B 27/143; G02B 27/4216; G02B 27/58; G02B 5/1885; G02B 6/04; G02B 6/12007; G02B 6/1345; G02B 6/2551; G02B 6/29364; G02B 6/3508; G02B 6/4215; G02B 6/4272; G02B 6/4286; G02B 2006/12166; G02B 21/36; G02B 27/04; G02B 27/08; G02B 27/126; G02B 27/425; G02B 27/60; G02B 3/0037; G02B 5/001; G02B 5/1823; G02B 6/0033; G02B 6/0048; G02B 6/0058

See application file for complete search history.

(56) References Cited

U.S. PATENT DOCUMENTS

2006/0196858 A1* 9/2006 Barron .................. B44F 1/06
  219/121.69
2023/0281781 A1* 9/2023 Dau ..................... H04N 23/81

FOREIGN PATENT DOCUMENTS

| WO | WO-9703846 A1 * | 2/1997 | ........... B23K 26/066 |
| WO | WO-9961890 A1 * | 12/1999 | ........... G01N 21/87 |
| WO | WO-2007067696 A1 * | 6/2007 | ........... A44C 17/00 |
| WO | WO-2009133393 A1 * | 11/2009 | ........... G01N 21/87 |
| WO | WO-2010075428 A1 * | 7/2010 | ........... G01N 21/87 |

(56) References Cited

FOREIGN PATENT DOCUMENTS

WO     WO-2019185974 A1 * 10/2019
WO     WO-2022128752 A1 * 6/2022

* cited by examiner

GEMSTONE INSCRIPTION VIEWING SYSTEM AND APPLICATIONS THEREOF

CROSS REFERENCE TO RELATED APPLICATIONS

This application claims priority of U.S. Provisional Application 63/587,604 which was filed on Oct. 3, 2023, and which is incorporated herein in its entirety be reference.

FIELD OF THE INVENTION

The invention generally relates to creating and viewing inscriptions in gemstones.

BACKGROUND

The supply of gemstones is a complex and global network that involves various actors, such as miners, traders, cutters, manufacturers, retailers, and consumers. Tracking the supply of gemstones is important for several reasons. First, it helps ensure the ethical and legal sourcing of gemstones thus avoiding the involvement of conflict, human rights abuses, environmental damage, or illicit trade in the supply chain. Second, it can help in providing information on a gemstone's origin, quality, value, and history. Further verification of this sort of information can help protect the reputation and credibility of the gemstone industry, ensuring compliance with standards, regulations, and best practices, and preventing fraud, counterfeiting, or misrepresentation of gemstones.

Marking is one of the methods that can help with the tracking of the supply of gemstones. Marking refers to the application of a physical or digital identifier on the gemstone or its packaging, such as a laser inscription, a barcode, a QR code, or a radio-frequency identification (RFID) tag. Usually, inscriptions are typically on the surface of a gemstone. This may enable an individual trying to obscure a gemstone's origin to remove the marking by some process, such as bruting or polishing.

To inspect a gemstone, a jeweler or other professional may use a loupe. A loupe is a small magnifying device that allows the user to examine objects or images in greater detail. Loupes can have different magnification levels, usually ranging from 2× to 20×, and some have built-in lights or filters to enhance the visibility or contrast of the object. Inscriptions large enough to be inspected with a loupe may be placed at the girdle of the gemstone.

Improved methods of inscribing gemstones and viewing inscriptions are needed.

BRIEF SUMMARY

In an embodiment, a viewing device is provided to magnify and view a marking on a gemstone. The viewing device includes a light source, a mask, a magnifying optical device and a camera. The light source is configured to generate light toward the gemstone. The viewing device further includes a mask configured to partially obscure the light from the light source to generate a pattern. The partially obscured light is reflected off the gemstone. The magnifying optical device is configured to magnify light reflected off the gemstone. Finally, the camera is positioned to capture the magnified light such that the pattern is captured by the camera when a table of the gemstone is oriented such that the marking is orientated to be captured by the camera.

In another embodiment, the viewing device includes a light source, a magnifying optical device, and a camera. The light source is configured to generate light towards a facet of the gemstone. The light travels through the gemstone and is scattered from a mark embedded in the subsurface of the gemstone. The mark may be a logo, QR code or other coded mark and/or serial number. The magnifying optical device is configured to magnify light reflected from and traveling through the top surface of the gemstone. Finally, the camera is positioned to capture the magnified light such that the mark in the gemstone can be read.

Certain embodiments of the invention have other steps or elements in addition to or in place of those mentioned above. The steps or elements will become apparent to those skilled in the art from a reading of the following detailed description when taken with reference to the accompanying drawings.

BRIEF DESCRIPTION OF THE DRAWINGS/FIGURES

The accompanying drawings, which are incorporated herein and form a part of the specification, illustrate the embodiments and, together with the description, further serve to explain the principles of the embodiments and to enable a person skilled in the relevant art(s) to make and use the embodiments.

In the drawings, like reference numbers generally indicate identical or similar elements. Additionally, generally, the left-most digit(s) of a reference number identifies the drawing in which the reference number first appears.

DETAILED DESCRIPTION OF THE INVENTION

Figure 1:
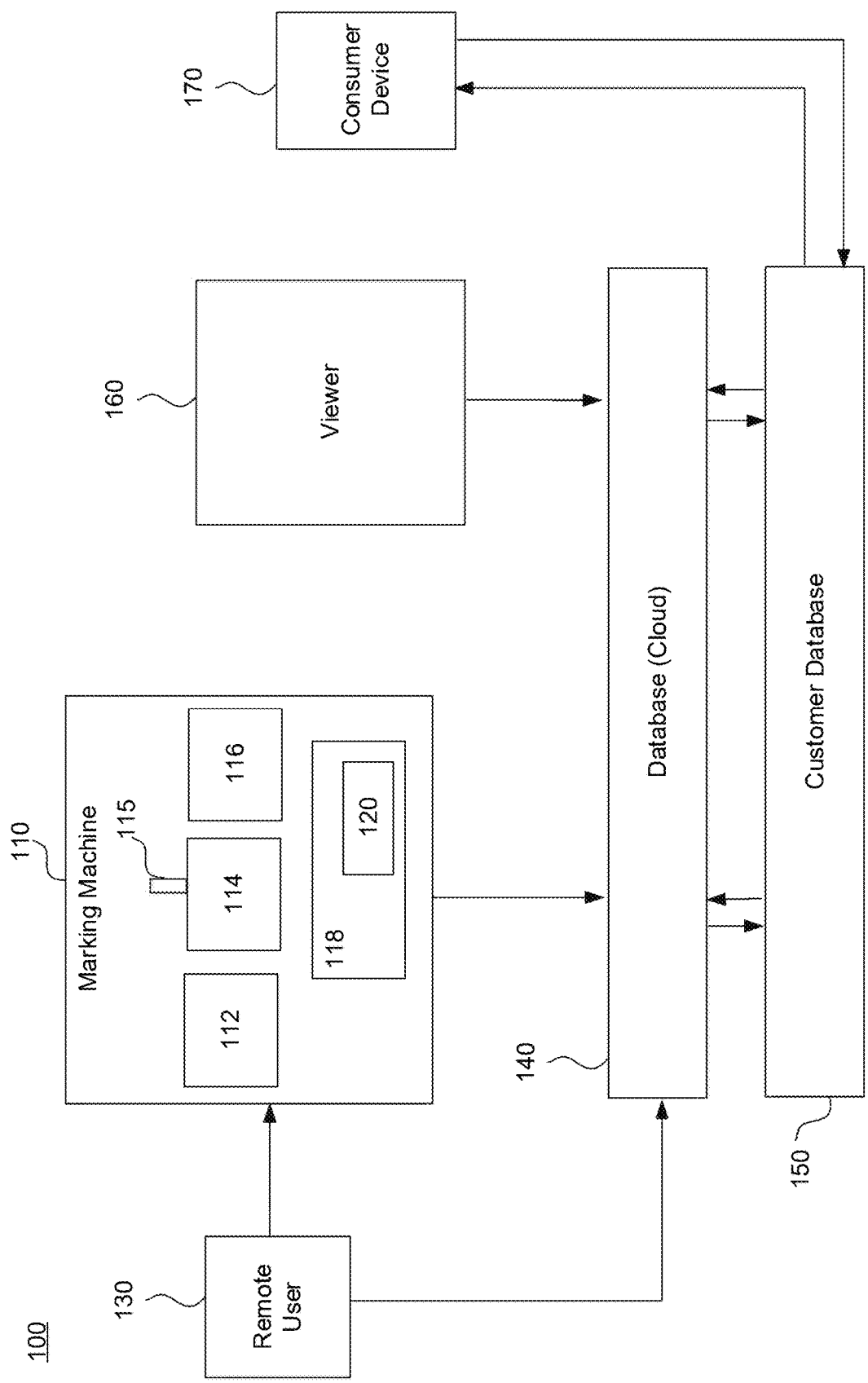
FIG. 1 shows a schematic of a gemstone marking and viewing ecosystem, according to some embodiments.

FIG. 1 shows a schematic of a gemstone marking and viewing ecosystem 100, according to some embodiments. Ecosystem 100 can comprise a marking machine 110, a remote user 130, a database 140, a customer database 150, a viewer 160, and a consumer device 170.

Marking machine 110 can use a laser to mark a logo, QR code or other coded mark and/or a serial number onto a gemstone. The logo, QR code or other coded mark and/or serial number can be marked at the surface or in the subsurface of the gemstone. A subsurface mark can be placed up to 0.18 millimeters (180 microns) beneath the surface of a gemstone and must be read at >100× magnification (Nano ID). A larger subsurface mark can be placed at depths of up to 0.25 millimeters (250 microns) beneath the surface of a gemstone and can be read using a standard 10× loupe (Loupe ID). A Loupe ID can be used in strategic places, such as the center of the table, to allow valuers, grading houses and consumers to quickly distinguish laboratory-grown or branded items from natural gemstones. The gemstone can comprise a diamond, sapphire, emerald, or the like.

Marking machine 110 comprises a front end computer 112, a backend computer 114, an aberration correction computer 116, and an optical assembly 118. Each of these components is described in turn.

Front end computer 112 allows a user to control marking machine 110. Front end computer 112 sends instructions to backend computer 114. Backend computer 114 can control hardware components of marking machine 110. In some embodiments, front end computer 112 and backend computer 114 communicate through TCP/IP on a private network within marking machine 110.

Front end computer 112 includes a graphical user interface. The graphical user interface allows a user to control marking machine 110. For example, user interface may allow a user to instruct marking machine 110 to inscribe a gemstone. It may provide information to a user about status of inscriptions. In some embodiments, front end computer 112 resides on a computing device physically located in marking machine 110. In this way, a local user can operate marking machine 110. In other embodiments (not shown), front end computer 112 may be a remote device comprising an application that allows a user to send instructions to backend computer 114.

In addition, a remote user can use remote access device 130 to control marking machine 110. Remote access device 130 may connect to front end computer 112 residing locally on marking machine 110. In some embodiments, remote access device 130 securely connects to front end computer 112 using a virtual private network (VPN). VPN creates a secure and encrypted connection over a less secure network, such as the internet. In addition to or as an alternative to connecting with front end computer 112, remote access device 130 may connect directly with backend computer 114.

Aberration correction computer 116 can project a predetermined phase image to an adaptive optical element, such as a spatial light modulator. This ensures that a third party cannot interfere with an aberration correction process, as described below.

Optical assembly 118 includes a set of optical components for imaging, focusing, splitting, and modifying light to and from the gemstone. Optical assembly 118 may generate and focus laser light to inscribe the gemstone.

Optical assembly 118 includes stage controller 120 to control its components. Stage controller 120 may for example be a microcontroller. A microcontroller is a small, integrated circuit that contains a processor, memory, and various peripherals that can perform specific tasks. Microcontrollers are often used to control devices or systems that require low power, high reliability, or embedded functionality. Microcontrollers differ from microprocessors, which are more general-purpose and require external memory and peripherals.

Stage controller 120 comprises an encrypted program that contains geometries for a series of marks/logos that marking machine 110 is able to print at the surface or subsurface of a gemstone. The series of marks/logos can be customer specific. In some embodiments, marks/logos are added to stage controller 120 before a customer receives marking machine 110 and can only be altered by a user with special privileges. For example, a password of sufficient length, complexity and randomness may be applied to stage controller 120. Because the customer is restricted, insurance is provided that the user of marking machine 110 cannot use marking machine 110 to inscribe the gemstone with counterfeit marks/logos.

In addition to a mark/logo that is used to establish provenance of a gemstone, marking machine 110 may be used to describe gemstones with a unique identifier. Front end computer 112 or backend computer 114 may interact with database 140 to retrieve an identifier for the gemstone generated remotely. Additionally or alternatively, front end computer 112 or backend computer 114 may generate an identifier for a gemstone and register the identifier with database 140 to retrieve an identifier for the gemstone generated remotely.

A USB device 115 may be employed on backend computer 114. USB device 115 can act as a license key for marking machine 110 and/or hold secure, encrypted information. In some aspects, a user is unable to operate marking machine 110 without USB device 115 inserted into backend computer 114.

When a gemstone is to be inscribed, front end computer 112 may communicate the identifier to backend computer 114, which may, in turn, communicate the identifier to stage controller 120. Stage controller 120 may have logic that combines the identifier with the logo and controls various components on optical assembly 118 to mark the gemstone. As will be discussed below, the identifier can be presented in various ways on the gemstone inscription. Optical assembly 118 and its operation will be described in greater detail below with respect to FIGS. 2-6.

Viewer 160 is a device used to view surface and/or subsurface marks (e.g. logos, QR codes or other coded marks and/or serial numbers) embedded in/on a gemstone by marking machine 110. Viewer 160 can be used by a non-technical user. Viewer 160 can be used to confirm a serial number, QR code or other coded mark and/or logo on a gemstone at various points in a gemstone supply chain. For example, viewer 160 can be deployed in a gemstone grading laboratory, in a jewelry manufacturer, and/or in a jewelry store. In some embodiments, viewer 160 can capture an image of a mark and compare the image with what is stored in database 140. In some embodiments, viewer 160 allows customers in a jewelry store to view marks embedded in/on a gemstone. Viewer 160 will be described in greater detail below with respect to FIGS. 7-9.

Database 140 can store data on gemstones marked by marking machine 110. As mentioned above, marking machine 110 can send quality control images, ID types, serial numbers, and cut and/or type of a gemstone to database 140. And, viewer 160 can send serial numbers or images of a gemstone to database 140. In some embodiments, viewer 160 may receive gemstone data and history from database 140. A skilled artisan would recognize that database 140 may be located in the cloud, and may be a distributed ledger. In some embodiments, access to database 140 may be protected by a VPN.

Information from database 140 may be shared with customer database 150. Customer database 150 may store information locally. Customer database 150 may contain, for example, images of a gemstone, history of a gemstone, and identifying information for a gemstone (i.e. serial number). Customer database 150 may send information on a gemstone on consumer device 170. Consumer device 170 may comprise a mobile phone and/or a personal computer.

Marking Machine

Figure 2:
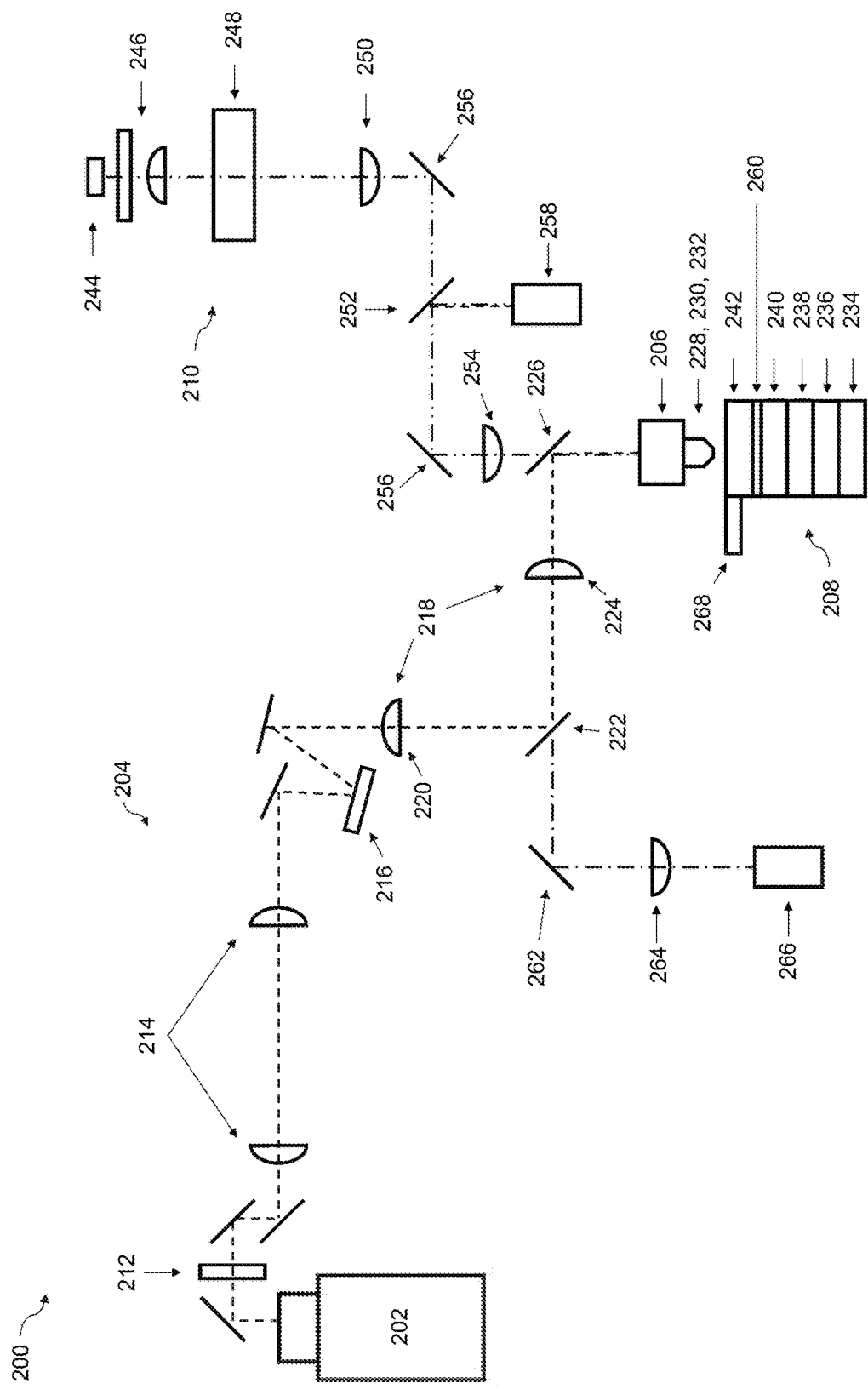
FIG. 2 shows an example optical assembly of a marking machine, according to some embodiments.

FIG. 2 illustrates a schematic of an optical assembly 200, according to some embodiments. Optical assembly 200 may be an embodiment of optical assembly 118 in marking machine 110. In some embodiments, optical assembly 200 can be used to mark and/or image a gemstone. Optical assembly 200 can comprise a laser 202, a beam conditioning path 204, microscope objective turret 206, a sample stage 208, and a viewing system 210. Each component is described in turn.

Laser 202 is a device that can produce a powerful, collimated beam of light. The light may have a single color and direction. In some embodiments, upon generation by laser 202, a beam first travels through a beam conditioning path 204. Beam conditioning path 204 alters the properties of the radiation beam on route using various optical devices. Beam conditioning path 204 includes a polarization control 212, a beam expander 214, an adaptive optical element 216, and an imaging system 218. As illustrated in FIG. 2, the laser beam may pass through each of these optical elements in turn as it travels along beam conditioning path 204.

Polarization control 212 alters the polarization of the beam exiting the laser. In some embodiments, polarization control 212 comprises a polarizing lens and one or more steering mirrors.

Beam expander 214 expands the diameter of the laser beam. The beam diameter is the diameter along any specified line that is perpendicular to the beam axis and intersects it. In some embodiments, the diameter of the beam can expand up to 10×. In different examples, beam expander 214 may be a telescopic beam expander or a prismatic beam expander.

Adaptive optical element 216 modifies the wavefront of the laser beam. One embodiment of an adaptive optical element may be a spatial light modulator. Adaptive optical element 216 imposes a spatially varying modulation on a beam of light. Adaptive optical element 216 generates designed, aberrated focal spots, which can improve focusing of a sample. In some aspects, designed aberrated focal spots are created by applying one or more Zernike polynomials to adaptive optical element 216. Adaptive optical element 216 may select and apply a wavefront to the beam of light. For subsurface markings, the wavefront may vary according to the material being marked (e.g., diamond, ruby, etc.), as different materials have different refractive indices. The wavefront may vary according to the desired depth where the mark is to be applied. A different wavefront may alter a depth where the beam focuses. How adaptive optical element 216 can select and apply a wavefront is described in detail in U.S. Pat. No. 11,685,003, which is herein incorporated by reference.

Imaging system 218 includes various optical elements that can relay phase information from adaptive optical element 216 to an objective lens on an objective lens turret 206. In particular, imaging system 218 includes a first lens 220 and a second lens 224, and the beam passes through each of these elements in turn. First lens 220 is located a focal length (i.e., focal length of first lens 220) away from adaptive optical element 216. A beam passing through first lens 220 can be directed towards beam splitter 222. Beam splitter 222 splits the beam into a reflected and a transmitted beam. The reflected beam then transits towards second lens 224. In some embodiments, second lens 224 is located a combined focal length (i.e. the combined focal length of first lens 220 and second lens 224) away from first lens 220 and a focal length (i.e., focal length of second lens 224) away from a pupil of an objective lens on an objective lens turret 206. First lens 220 and second lens 224 together may reduce the beam diameter to better suit the aperture of the pupil.

After passing through imaging system 218, the laser beam travels towards a dichroic mirror 226. Dichroic mirror 226 selectively reflects light within a small range of colors, while letting other colors pass through. Dichroic mirror 226 reflects light that is longer than 805 nm (near-infrared dichroic) and allows light shorter than 805 nm to pass through. The laser beam is configured to primarily fall within this range of colors, thus dichroic mirror 226 reflects the laser beam towards microscope objective turret 206.

Microscope objective turret 206 is an optical assembly including three lenses: a first objective lens 228, a second objective lens 230, and a third objective lens 232. First objective lens 228 has a 2× magnification, second objective lens 230 has a 10× magnification, and a third objective lens 232 has a ≥40× magnification. To switch between the first, second and third lenses, marking machine 110 uses a motorized turret.

The laser beam can then travel through a microscope objective lens on microscope objective turret 206 and illuminate a sample housed on sample stage 208. As mentioned above, the sample may be a gemstone, and sample stage 208 may hold a plurality of gemstones. A human operator may place the plurality of samples on sample stage 208, and marking machine 110 may mark each of the samples serially in sequence.

To ensure proper targeting and focus, a sample must be aligned in the focal plane of an objective lens. As mentioned above, sample stage 208 may have a plurality of gemstones placed by hand. Thus, the sample stage 208 may need to be translated in the X-Y directions to target the correct gemstone and to target the marking in the correct portion of the gemstone. In addition, different samples may vary in size and thus the Z position may need to be adjusted to ensure that the sample is focusing correctly. Similarly, as mentioned above, the samples may be placed on sample stage 208 by hand. Thus, the sample may have imperfect orientation. For example, to properly mark a gemstone, a table of the gemstone may be need to be substantially perpendicular with the laser beam. Thus a tilt (e.g., roll and pitch) of sample stage 208 may need to be adjusted.

To conduct the rotation and translation, sample stage 208 can include four sub-stages: an x-position stage 234, a y-position stage 236, a z-position stage 238, and a tilt stage 240. In some embodiments, each sub-stage can be moved independently. Stage controller 120 can control movements of x-position stage 234, y-position stage 236, and z-position stage 238 during sample focusing and marking. As described above, stage controller 120 can receive instructions from backend computer 114. Tilt stage 240 can be controlled by a secondary controller (not shown), which can receive instructions from backend computer 114. A sample holder, 242, may reside on top of tilt stage 240. Sample holder 242 may be configured to hold multiple gemstones.

Light (including light from the laser) is reflected from the sample. The reflected light travels back through an objective lens towards viewing system 210. As will be described in greater detail below, viewing system 210 can be used to collect data on sample position and orientation so that backend computer 114 can send instructions to stage controller 120 to adjust the gemstone orientation.

Viewing system 210 can illuminate a sample through a one optical path and capture light reflected from a sample through another optical path. In particular, viewing system 210 includes an illuminating element 244, a diffuser and collimation lens 246, a filter wheel housing 248, a lens 250, a beam splitter 252, a tube lens 254, one or more steering mirrors 256, and a camera 258. Each of these components is described below.

Illuminating element 244 produces light in the visible region of the electromagnetic spectrum. In some embodiments, illuminating element 244 is a light emitting diode. Light from illuminating element 244 travels through diffuser and collimation lens 246 and an aperture in filter wheel housing 248. Diffuser and collimation lens 246 may diffuses or scatters light in some manner to soften the light.

Filter wheel housing 248 can comprise an aperture and four masks. Each mask can rotate in front of the aperture and block a portion of incoming light from illuminating element 244. Light passing through the aperture/mask is focused and steered towards a sample through the optical path described above. Light reflected from the sample is directed through an objective, focused by tube lens 254, and directed towards camera 258 by beam splitter 252. The above process can be repeated for each mask, resulting in four images. In some embodiments, the four images can be combined through an algorithmic process to generate a single image of a feature on the surface of the sample with high contrast. In some embodiments, light passing through a first mask can illuminate a top right corner of the sample, light passing through a second mask can illuminate a top left region of the sample, light passing through a third mask can illuminate a bottom left region of the sample, and light passing through a fourth mask can illuminate a bottom right region of the sample.

After passing through filter wheel housing 248, the light is then directed towards lens 250, beam splitter 252 and tube lens 254. The light can be guided by one or more steering mirrors 256. In some embodiments, the light then travels through dichroic mirror 226 and an objective lens on microscope objective turret 206 to reach the sample.

Light reflected from the sample can travel back through an objective lens and dichroic mirror 226. In some embodiments, tube lens 254 focuses the reflected light and beam splitter 252 directs half of the reflected light towards camera 258. Light reflected from a sample may be laser light supplied by laser 202 and/or illuminating element 260.

A sample may additionally be illuminated by a series of illuminating elements 260. Series of illuminating elements 260 may be located between tilt stage 240 and sample holder 242. In some embodiments, light from series of illuminating elements 260 may be used to image a nanoscale, subsurface mark of a gemstone.

Dichroic mirrors, such as dichroic mirror 226 are not 100% effective, and allow a portion of incoming light with a wavelength greater than 805 nm to pass through. Therefore, in some embodiments, a small fraction (roughly 1%) of infrared laser light reflected from the sample can pass through dichroic mirror 226.

As mentioned above, viewing system 210 includes camera 258. Camera 258 may be used to image a sample. For example, a gemstone can be imaged after a mark has been embedded onto the gemstone. In some embodiments, a mark on a gemstone comprises a series of 50 nanometer deep dots. In some embodiments, a differential angle resolved phase gradient process can be used to image a mark at the surface of a gemstone.

As mentioned above, in a differential angle resolved phase gradient process, a series of masks can be used to successively illuminate different regions of a sample. Reflected images from each successive illumination can be combined in an algorithmic process to enhance the contrast of features on the surface of a sample. Differential interference contrast microscopy techniques can also be used to image small features on the surface of a sample by analyzing reflections of light at different angles.

Images captured by camera 258 have a variety of uses. As mentioned above images from camera 258 may be used to control sample stage 208 and ensure that the laser beam is properly targeted and focused. This is described below with respect to FIGS. 3-6. In another example, images of a sample can be used for quality control. For example, images of a logo, QR code or other coded mark, and/or serial number on a sample can be captured directly after marking to ensure that the marking process was successful. In another example, images of a sample can be used to enhance security of the marking process. As mentioned above, an image from camera 258 may be transmitted to a remote database. Then, later, the image may be compared to another image to ensure that the gemstone is genuine and not counterfeit.

To ensure that the image is not counterfeit, different techniques are available to prepare an image of the gemstone being marked to a later captured image. For example, a customer can compare angled polishing lines of a gemstone to an orientation of a marking at the surface or subsurface of a sample. In another example, a jitter in the X and Y directions can be applied to dots comprising a marking. For example, if a desired pitch of a logo is 2 microns, the pitch of the logo can randomly vary between 1 and 3 microns, such that the average pitch is 2 microns. This technique can be detected in a differential angle resolved phase gradient image. A gemstone with jitter can be authenticated by comparing a new image of the gemstone with a prior image of the gemstone, according to some embodiments.

A second camera, camera 266 can be used to monitor alignment of marking machine 110. Laser light reflected from a sample can be reflected by dichroic mirror 226 towards beam splitter 222. In some embodiments, about 10% of the reflected laser light can pass through beam splitter 222. In some embodiments, the light is then steered by steering mirror 262 towards tube lens 264, which focuses the reflected light onto second camera 266. In some embodiments, an image from second camera 266 can be used for system diagnostics. In this way, an image from second camera 266 can be used to monitor alignment.

Also useful for monitoring proper operation of marking machine 110, sample stage 208 includes a power meter 268, which measures optical power coming through to sample stage 208. In some embodiments, power meter 268 allows a remote user to measure the power of a laser beam traveling through an objective lens on microscope objective turret 206. Laser 202 also includes a power meter, which measures power of light exiting laser 202. In some embodiments, a remote user may compare power measurements from laser 202 and power measurements from power meter 268 to diagnose a problem in marking machine 110.

Figure 3:
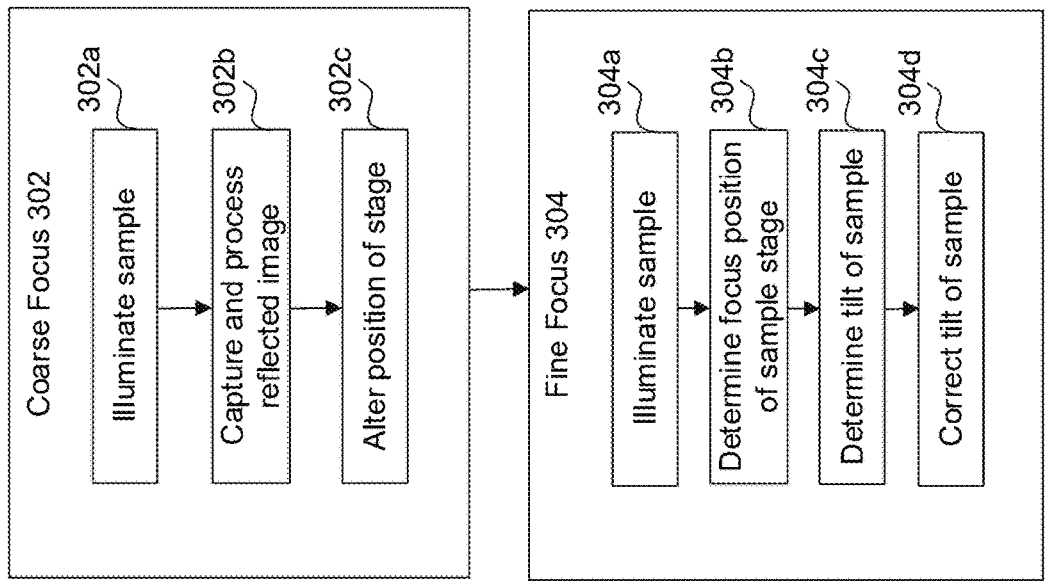
FIG. 3 shows a method of focusing a sample in a marking machine, according to some embodiments.

FIG. 3 shows a method 300 of focusing a sample in a marking machine, such as marking machine 110, according to some embodiments. Method 300 can comprise coarse focusing step 302 and fine focusing step 304. In some embodiments, coarse focusing step 302 utilizes a 2× magnification objective lens and fine focusing step 304 utilizes a ≥40× magnification objective lens.

Coarse focusing step 302 further comprises steps 302a, 302b, and 302c. At step 302a, the sample is illuminated. In some embodiments, the sample is illuminated by light from illuminating element 242. In some embodiments, light from illuminating element 242 can be reflected from the sample and directed towards camera 256 through the optical path described above.

At step 302b, an image of the light reflected from the sample is captured by camera 256 and processed by backend computer 114. In some embodiments, a software program running on backend computer 114 can determine if a sample is focused. In some embodiments, the software program comprises a Laplacian algorithm. In some embodiments, the software program is run on the front end computer 112.

At 302c, the z-position of the stage is altered to sharpen the image of the sample. In some embodiments, the stage is moved manually by an operator. In some embodiments, the stage is automatically moved to a position determined by a software program. For example, the software program at step 302a determines whether the stage is moved in the positive Z or negative Z direction. In some embodiments, backend computer 114 moves the stage.

Fine focusing step 304 includes steps 304a, 304b, 304c, and 304d. At step 304a, the sample is illuminated with laser light. In some embodiments, the laser light is aberrated by passing light from laser 202 through spatial light modulator 216 in beam conditioning path 204. In some embodiments, the laser light is infrared light.

At step 304b, a z-position of the sample when it is in focus is determined. The sample is in focus when it is located at the focal plane of an objective lens. As mentioned above, camera 258 captures an image of the laser. And, based on the image, backend computer 114 determines whether the image is in focus. In some embodiments, a processor in marking machine 110 utilizes a machine learning algorithm to determine the focused z-position of the sample stage. Training of the machine learning algorithm as described below with respect to FIG. 6. How the location of the laser in the captured image relates to whether the image is in focus is described in greater detail with respect to FIGS. 4 and 5. Based on the focus determination, backend computer 114 can send instructions to stage controller 120 to adjust the stage's Z position.

At step 304c, a flatness of the sample is determined. As described above, a sample can be tilted with respect to the focal plane of an objective lens. To determine the tilt, sample stage 208 is moved in an x-direction and/or a y-direction. For each new x and y position, the sample is refocused in the z-direction. This process can be repeated for several x and y positions. Using the several determined z-directions, a processer (in e.g., backend computer 114) determines the tilt angles (e.g., pitch and roll) of the sample.

At step 304d, a tilt of the sample is corrected based on the tilt angles determined at step 304c. Using these determined values, backend computer 114 instructs stage controller 120 to adjust the tilt angles of tilt stage 240 to make the sample flat. In some embodiments, the tilt of the sample is adjusted manually. In other embodiments, the tilt of the sample is adjusted automatically.

The method steps of FIG. 3 can be performed in any conceivable order and it is not required that all steps be performed. Moreover, the method steps of FIG. 3 described above merely reflect an example of steps and are not limiting. That is, further method steps and functions are envisaged based aspects described in reference to FIGS. 1-2 and 4-6.

Figure 4:
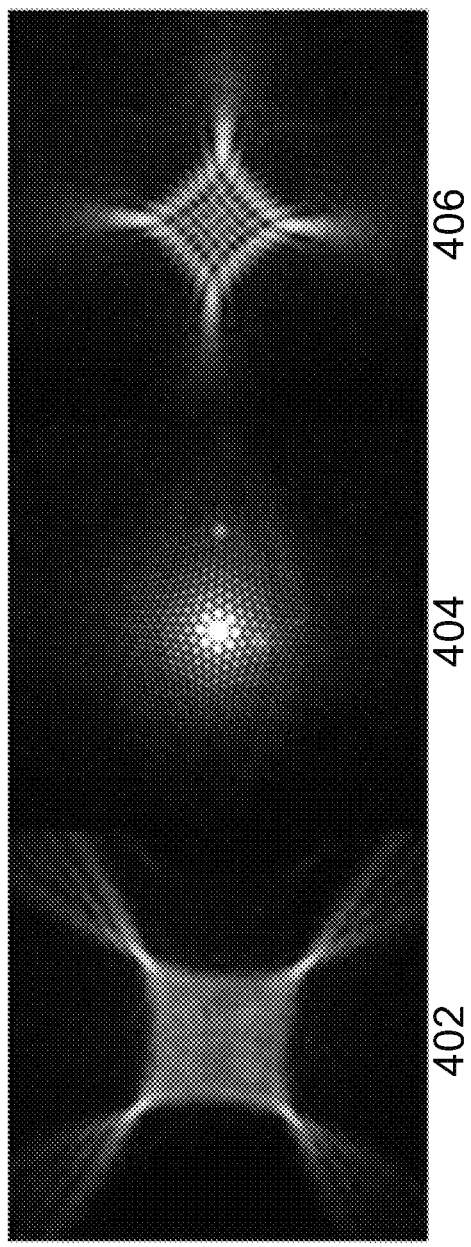
FIG. 4 shows in focus and out of focus images of a sample, according to some embodiments.

FIG. 4 shows images 402, 404, and 406 of a sample at different z-positions (i.e different focal planes of a microscope objective), according to some embodiments. In some embodiments, image 402 shows a sample below the focal plane of the microscope objective. In some embodiments, image 404 shows a sample located at the focal plane of the microscope objective (focused z-position). In some aspects, image 406 shows a sample located above the focal plane of the microscope objective. As shown by the pattern of dots in the focused image 404, the laser beam may be aberrated during the fine focus operation.

Designed, aberrated focal spots, such as those shown in FIG. 4, can provide information about a sample position over a larger range than an unmodified spot. For example, an aberrated focal spot can provide information on whether a sample is above or below focus and provide accurate predictions of the distance to sample focus.

Using diffractive optical elements, such as spatial light modulator 216, it is possible to generate multiple designed, aberrated focal spots simultaneously at different XYZ locations, which further increases the range of sample height measurements. The XY location or designed shape of focus can provide information about both sample height and sample flatness.

Figure 5:
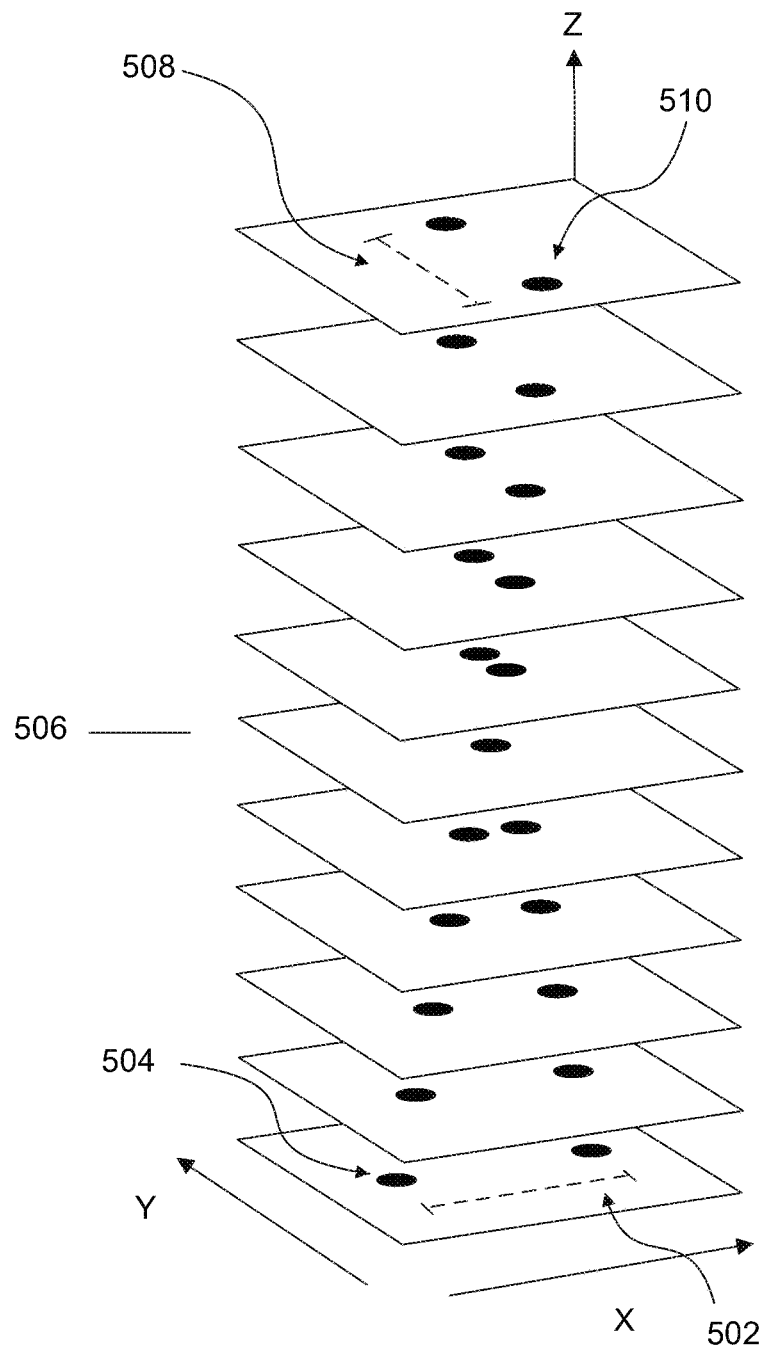
FIG. 5 shows an example aberrated spot pattern of a laser beam, according to some embodiments.

FIG. 5 shows an exemplary aberrated focal spot design 500, according to some embodiments. As shown in FIG. 5, distance 502 between spots 504 appears to increase in the x-direction as the sample moves below focus plane 506 in the z direction. In some embodiments, distance 508 between spots 510 appears to increase in the y-direction as the sample moves above focus plane 506 in the z-direction.

It can be difficult for a human to consistently interpret or decode complex designed focal shapes, which could lead to inaccurate or inconsistent laser focusing. When trained on useful data, machine learning models are able to consistently and accurately predict a distance in the z direction required to move to best focus. As mentioned above, this distance determination can be determined at several nearby x-y positions on the gemstone. By determining the varying Z distances across and x-y plane, a tilt of sample may be determined.

Figure 6:
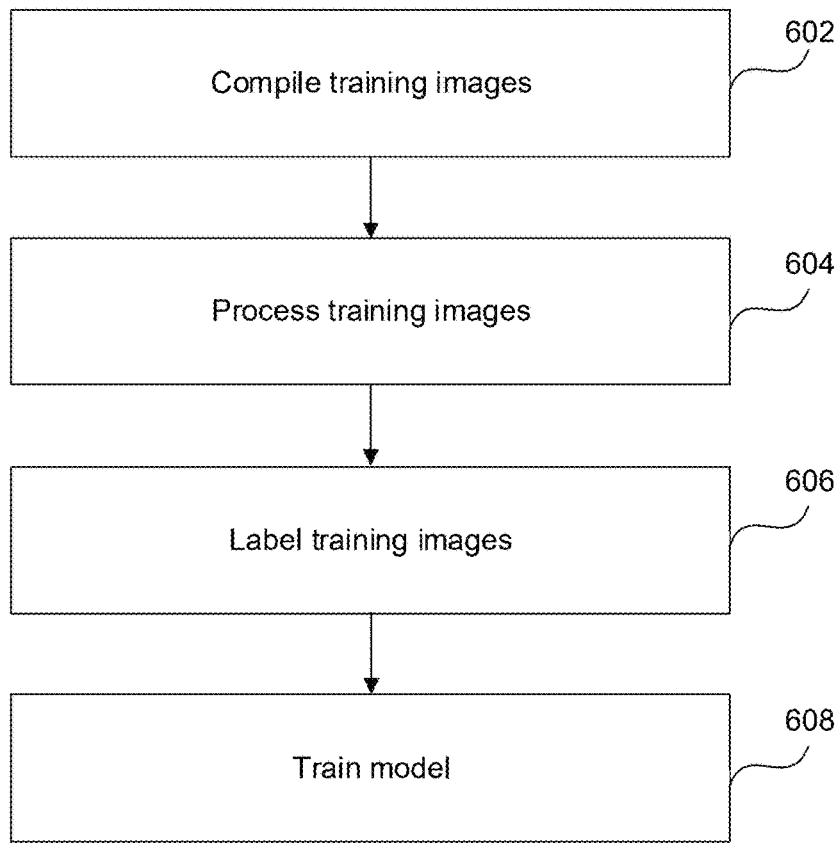
FIG. 6 shows a method of training a data model for automatic focus of a sample in a marking machine, according to some embodiments.

FIG. 6 shows a method 600 of training a data model to predict a distance from focus associated with an image of a laser spot, according to some embodiments. As mentioned above, the data model trained in step 608 can be used in fine focusing step 304, as described above. Method 600 includes steps 602, 604, 606, and 608.

At step 602, a plurality of training images of a reflected laser spot at several distances from ideal focus are compiled. In some embodiments, the plurality of training images can be captured images of aberrated laser light reflected from a sample, such as the images shown in FIG. 4. The training images may be captured images of aberrated laser light from samples comprising the same material. In some embodiments, the plurality of training images may be simulated images of the expected appearance of the laser spot (calculated theoretically). In some embodiments, the plurality of images can include a mixture of simulated images and captured images.

At step 604, the plurality of training images compiled in step 602 are processed. The image processing operations may include, but are not limited to, resizing, cropping, normalizing, rotating or adding noise to the data.

At step 606, the plurality of training images are labeled. Image labels may indicate the image's distance from focus and the image's direction from focus.

At step 608, the data model is trained to predict the distance from focus for new images of laser spots. Step 608 can utilize labeled training data compiled in steps 604 and 606. In example implementations, the data model can comprise a convolutional neural network or an artificial neural network. Drop-out layers can be used in a convolutional neural network layer structure to improve the generalization capabilities of the network, to avoid overfitting.

In another embodiment, in addition to the distance from focus, the data model may be trained to predict (classify) the spot into classes, such as above-focus or below focus.

The method steps of FIG. 6 can be performed in any conceivable order and it is not required that all steps be performed. Moreover, the method steps of FIG. 6 described above merely reflect an example of steps and are not limiting. That is, further method steps and functions are envisaged based aspects described in reference to FIGS. 1-5.

With the combination of designed focal aberrations and data model detection, sample focusing and flattening using a laser can be more accurate, robust, efficient and reduce collision risks arising from sample position uncertainty. With diffractive optical elements it is easy to then switch between 'focusing mode' and 'processing mode' without moving the focusing objective or without changing the optical setup.

Mark Viewing System

Figure 7:
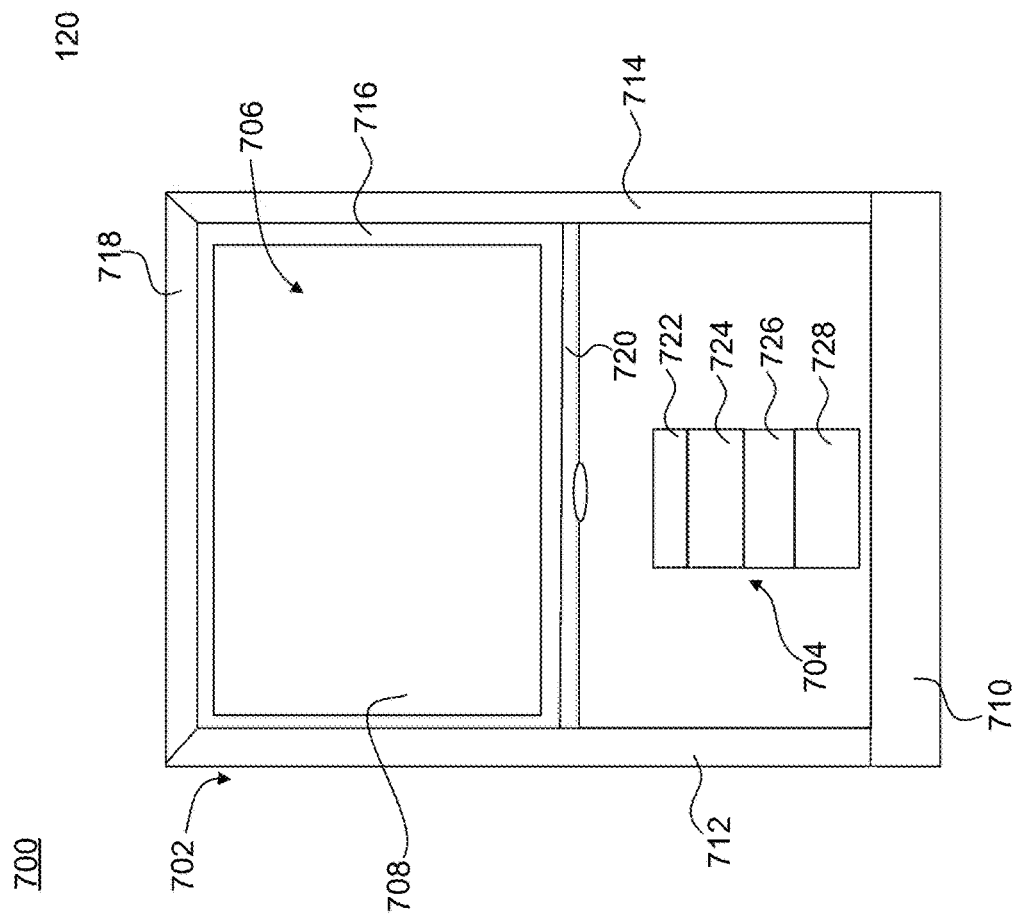
FIG. 7 shows a schematic of a sample viewer, according to some embodiments.

FIG. 7 illustrates a schematic of a viewer 700, according to some embodiments. Viewer 700 can be an embodiment of viewer 160. In some embodiments, viewer 700 can be used to view surface or sub-surface elements of a sample. For example, viewer 700 can be used to view a logo, QR code or other coded mark and/or serial number embedded on the surface and/or subsurface of a gemstone. In some embodiments, viewer 700 can be used by a non-technical user.

Viewer 700 can comprise a frame 702, a holder 704, an optics assembly 706, and a display 708. In some embodiments, frame 702 holds display 708 and optics assembly 706 above holder 704.

Frame 702 comprises a base 710, a first member 712, a second member 714, a frame support 716, a top cover 718, and a bottom cover 720. In some embodiments, first member 712 and second member 714 are attached to and protrude upwards from base 710. In some embodiments, frame support 716 is attached to the sides of first member 712 and second member 714 and is suspended above base 710. Top cover 718 can be attached to the top of frame support 716, while bottom cover 720 can be attached to the bottom of frame support 716. In some embodiments, optics assembly 706 and display 708 are housed in frame support 716. In FIG. 7, optics assembly 706 is shown behind display 708. In some embodiments, bottom cover 720 comprises an opening which allows light to pass to and from optics assembly 706.

Holder 704 is located on base 710. Holder 704 can comprise an insert 722, a tilt-tip adjust 724, a z-position adjust 726, and a base 728. In some embodiments, insert 722 is configured to hold a sample, such as a gemstone. In some embodiments, insert 722 is comprised of a foam insert with a slot for holding a sample. In some embodiments, insert 722 comprises a flat disk. In some embodiments, a first embodiment of insert 722 can be swapped for a second embodiment of insert 722 to accommodate a different sample (e.g. a ring vs a watch). In some embodiments, tilt-tip adjust 724 is located below insert 722 and configured to adjust the tilt and/or tip of a sample held by insert 722. In some embodiments, z-position adjust 726 is located below tilt-tip adjust 724 and configured to adjust a z-position of a sample held by insert 722. In some embodiments, z-position adjust 726 is supported by base 728. In some embodiments, the bottom of base 728 comprises an anti-slip fabric.

Tilt-tip adjust 724 and z-position adjust 726 can alter the tilt and/or z-position of a sample until the sample is flat and the sample resides in the focal plane of an objective lens in optics assembly 706. In some embodiments, holder 704 is positioned directly below an opening in bottom cover 720, such that light from optics assembly 706 illuminates a sample held by insert 722.

Optics assembly 706 illuminates the sample in holder 704. Light reflected from the sample can be captured by optics assembly 706 and converted into an image that can be displayed on display 708. In some embodiments, optics assembly 706 is located behind display 708 (as shown in FIG. 7). In some embodiments, a back panel (not shown) may sit opposite of display 708 in frame support 716.

Figure 8:
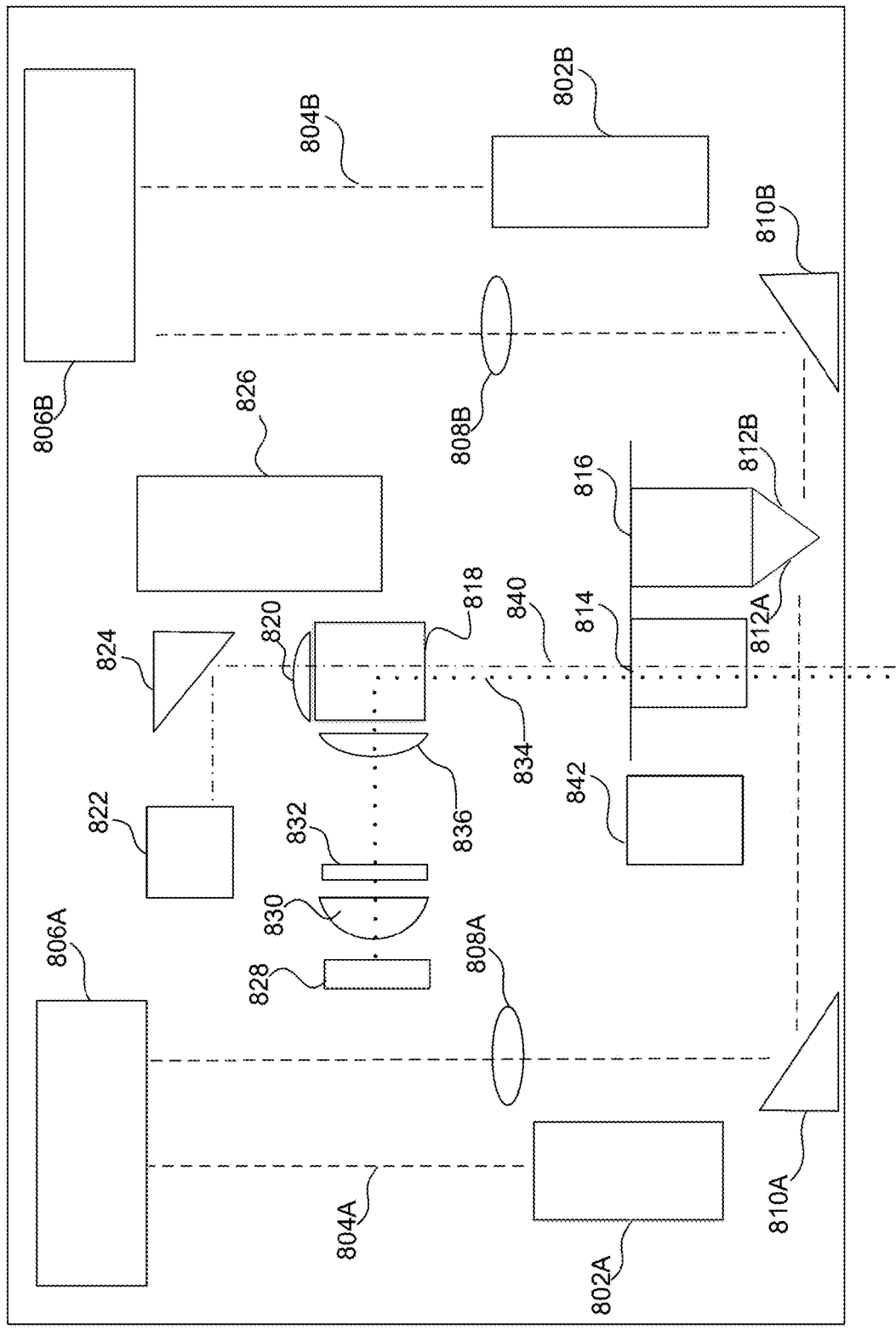
FIG. 8 shows an optics assembly of a sample viewer, according to some embodiments.

FIG. 8 illustrates a schematic of optics assembly 800, according to some embodiments. Optics assembly 800 can be an embodiment of optics assembly 706.

In optics assembly 800, light from illuminating elements 802A and 802B follows paths 804A and 804B to illuminate the gemstone. Illuminating elements 802A and 802B are light sources and can comprise light emitting diodes. The light sources may be coherent light sources. As illustrated by paths 804A and 804B, the light from illuminating elements 802A and 802B is reflected by mirror systems 806A and 806B.

Light reflected by mirror systems 806A and 806B can be focused by lenses 808A and 808B. Mirrors 810A and 810B reflect the focused light towards mirrors 812A and 812B, where the light is then reflected towards a sample in holder 704. Light reflects from the sample and travels through objective lens 814 or objective lens 816 towards beam splitter 818. In some embodiments, the light exiting beam splitter 818 is focused by lens 820 and reflected towards camera 822 by mirror 824. Processor 826 displays an image from camera 822 onto display 708.

Mirrors 812A and 812B are located on objective lens 816. Objective lens 814 provides 2× magnification and objective lens 816 provides 4× magnification. A user can switch between objective lens 814 and objective lens 816. Objective lens 814 (2× magnification) can be used to focus a sample. In addition, objective lens 814 (2× magnification) can be used to view a mark (e.g. logo/serial number) up to 0.25 millimeters beneath a surface of a gemstone (Loupe ID). Objective lens 816 can be used to finely focus a sample. In addition, objective lens 816 (4× magnification) can be used to view a nanoscale mark placed up to 0.18 millimeters beneath the surface of a gemstone (Nano ID). While such marks are typically read at greater than 100× magnification, additional magnification elements in optics assembly 800, as described below, allow a nanoscale mark to be read with a 4× magnification objective lens.

To view surface or sub-surface marks of a sample (e.g., logo, serial number), the sample must be in focus. The sample may be oriented and focused by illuminating the sample with patterned light.

To illuminate with patterned light, light from illuminating element 828 travels through lens 830 towards mask 832. Illuminating element 828 is a light source configured to generate light directed along a path 834 toward the gemstone.

As shown by path 834, mask 832 is configured to partially obscure the light from the light source to generate a pattern. In one example, the pattern may be striped lines. In another example, the pattern may illustrate a brand or logo of a retailer operating optics assembly 800.

The patterned light exiting mask 832 is focused by lens 836 and reflected from beam splitter 818 towards objective lens 814 or objective lens 816. The patterned light is projected onto the surface of the sample.

When the surface of the sample is flat, some of the partially obscured light is reflected off the sample. In the context of gemstones, the sample may be substantially flat when a table of the gemstone is oriented such that the marking is orientated to be captured by camera 822. In this configuration, light entering the magnifying optical device is substantially normal to the table of the gemstone. In this way, the patterned light is only visible by camera 822 when the sample is located in the focal plane of an objective lens (e.g., lens 814 or 816) and tilted such that an upper surface of the sample is flat. An operator can use tilt-tip adjust 724 and z-position adjust 726 to adjust a position and orientation of the sample until the patterned light is in focus (i.e., appears on the display 708).

After a sample is focused, mask 832 can be moved out of the path of illuminating element 828 allowing illuminating element 828 to illuminate the surface of the sample without projecting patterned light. Additionally or alternatively, illuminating element 828 may be deactivated, and the sample may be illuminated with illuminating elements 802A and 802B. An example of how illumination may occur with illuminating elements 802A and 802B is described below. Either way, light emerges from the table of the gemstone along path 840 through objective lens 814 or 816, beam splitter 818, lens 820 and mirror 824 to camera 822 to capture an image of the sample.

Light reflected from a gemstone may be captured by a second camera 842. Camera 842 can capture light reflected directly off of the sample and can provide a wider field of view than camera 822. In some instances, a processor may be integrated into camera 842.

As mentioned above, the image may be a marking, such as an inscription, in the gemstone. The inscription may be on the surface or subsurface of the gemstone. The inscription may for example be embedded logos or an identifier, such as a serial number.

Optics assembly 800 may include a computing device (not shown) configured to recognize an identifier in the inscription. For example, a computer vision algorithm may recognize the logo and identify the entity that marked the gemstone based on the logo. Additionally or alternatively, the identifier may be read (e.g., using an optical character recognition algorithm) and the computing device may query a database using the identifier to retrieve data describing the gemstone. As described above, the data describing the gemstone include a provenance of the gemstone.

Different cuts of gemstone require different illumination paths. The position of a focal spot of incoming light on a gemstone may be changed by altering the position of lenses 808A and/or 808B. Lenses 808A and 808B may be connected to a stepper motor or other type of actuator (not shown). Ideal positions of lenses 808A and 808B for a given gemstone may be determined by a machine learning algorithm. For example, a machine learning algorithm may process an image captured by camera 822 and determine a direction of movement for lens 808A and/or 808B.

In some embodiments, light from illuminating element 828 reflects off the surface of the sample in regions where there are no surface marks and is scattered by regions that contain surface marks. In some embodiments, a camera, such as camera 822 captures an image of the reflected light. Due to scattering, the surface marks appear as dark areas in the image. In some embodiments, the surface marks can be enhanced using image filtering methods, such as a Top Hat Filter. In some embodiments, surface marks are viewed under 4× magnification.

Figure 9:
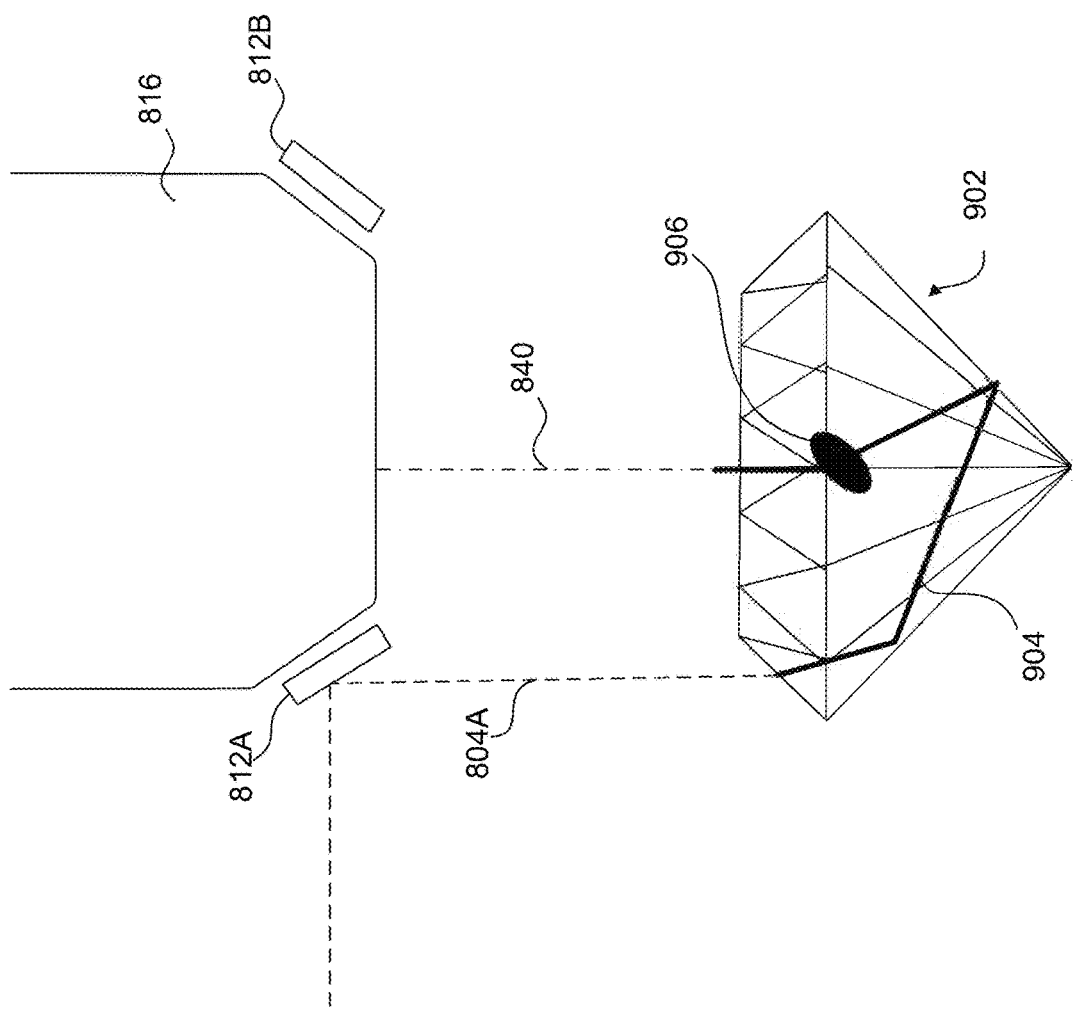
FIG. 9 shows facet illumination of a gemstone in a sample viewer, according to some embodiments.

FIG. 9 shows an example reflection path of light through a facet of a gemstone, according to some embodiments. In some embodiments, objective mirrors 812A and 812B can be positioned to direct light on paths 804A and/or 804B towards a preferred facet of gemstone 902. The preferred facet of gemstone 902 may be a facet other than the table of the gemstone. In different examples, the facets may be a crown facet (e.g., a star facet, crown main facet, or break facet), a girdle facet, or a pavilion facet (e.g., a pavilion main facet or break facet).

In some embodiments, light on path 804A experiences total internal reflection in gemstone 902, as shown by reflection path 904. Multiple embodiments of reflection path 904 can exist inside gemstone 902. As light travels through gemstone 902, the light can scatter at a subsurface mark 906 inside gemstone 902, according to some embodiments. In some embodiments, reflected and scattered light on path 840 can travel through objective lens 816 towards a camera, such as camera 822. In some embodiments, light can be reflected from one of objective mirrors 812A and 812B or both objective mirrors 812A and 812B.

In some embodiments, objective mirrors 812A and 812B can be moved laterally to direct light through a preferred facet of a gemstone. In some embodiments, the preferred facet of a gemstone is dependent on the cut of the gemstone. In some embodiments, simulations can determine a preferred facet to illuminate for each cut of a gemstone.

In some embodiments, an image of light scattered from a subsurface mark can be captured by a camera, such as camera 822. In some embodiments, light scattered from a subsurface mark, such as a series of nanoscale dots, can appear as bright spots on the image.

In some embodiments, computer vision can be applied to an image of surface and/or subsurface marks. In some embodiments, a computer vision model can be trained to identify and retrieve a serial number embedded on/in a sample. In some embodiments, the serial number can be uploaded to a database, such as database 140.

In some embodiments, a chip or cloud based encryption may be applied to viewer 700.

Figure 10:
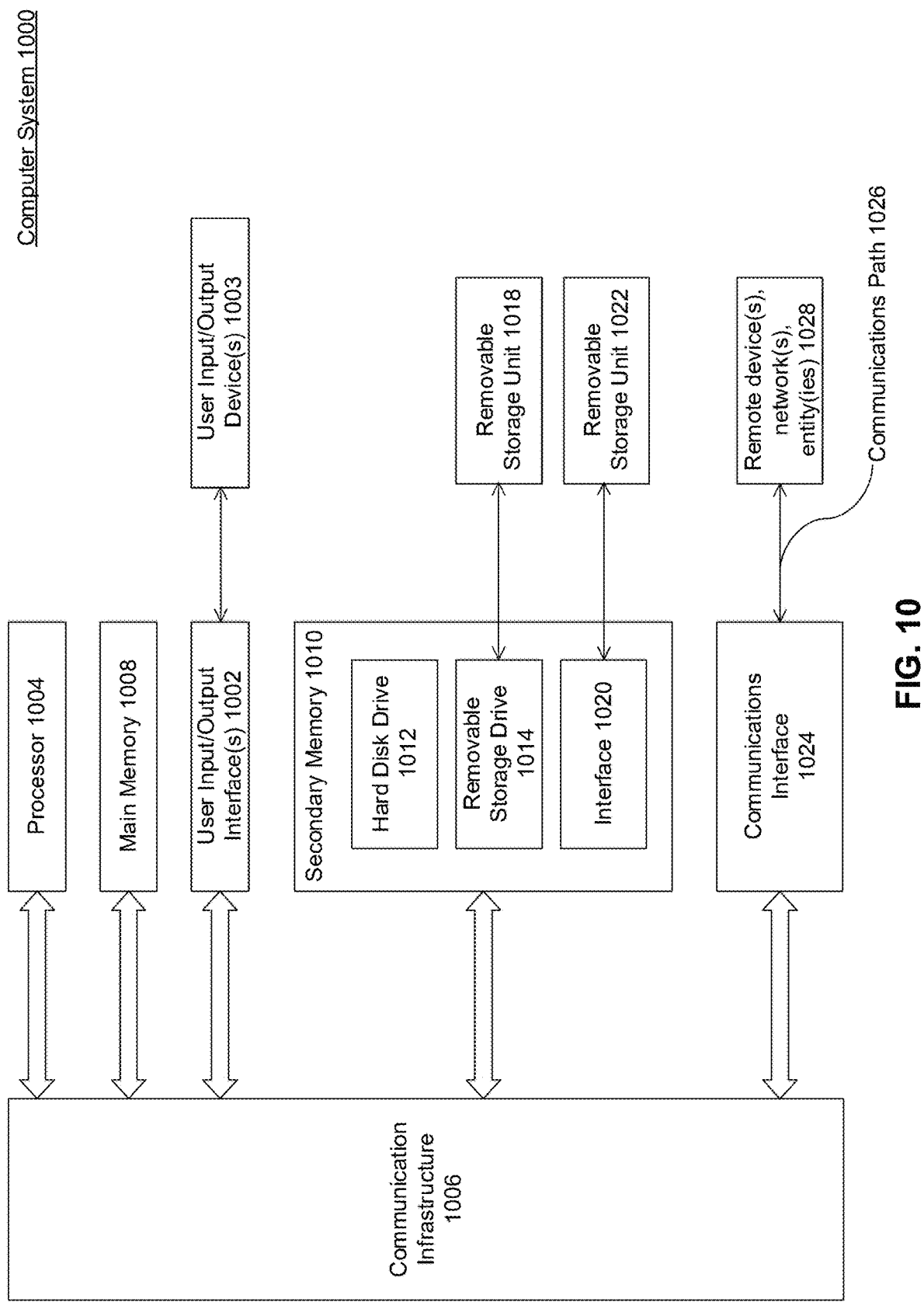
FIG. 10 shows an exemplary computing system.

FIG. 10 illustrates an example computer system useful for implementing various embodiments in FIGS. 1-9.

Various embodiments may be implemented, for example, using one or more well-known computer systems, such as computer system 1000 shown in FIG. 10. One or more computer systems 1000 may be used, for example, to implement any of the embodiments discussed herein, as well as combinations and sub-combinations thereof.

Computer system 1000 may include one or more processors (also called central processing units, or CPUs), such as a processor 1004. Processor 1004 may be connected to a communication infrastructure or bus 1006.

Computer system 1000 may also include user input/output device(s) 1003, such as monitors, keyboards, pointing devices, cameras, other imaging devices etc., which may communicate with communication infrastructure 1006 through user input/output interface(s) 1002.

One or more of processors 1004 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1000 may also include a main or primary memory 1008, such as random access memory (RAM). Main memory 1008 may include one or more levels of cache. Main memory 1008 may have stored therein control logic (i.e., computer software) and/or data.

Computer system 1000 may also include one or more secondary storage devices or secondary memory 1010. Secondary memory 1010 may include, for example, a hard disk drive 1012 and/or a removable storage device or drive 1014. Removable storage drive 1014 may be a floppy disk drive, a magnetic tape drive, a compact disk drive, an optical storage device, tape backup device, and/or any other storage device/drive.

Removable storage drive 1014 may interact with a removable storage unit 1018. Removable storage unit 1018 may include a computer usable or readable storage device having stored thereon computer software (control logic) and/or data. Removable storage unit 1018 may be a floppy disk, magnetic tape, compact disk, DVD, optical storage disk, and/any other computer data storage device. Removable storage drive 1014 may read from and/or write to removable storage unit 1018.

Secondary memory 1010 may include other means, devices, components, instrumentalities or other approaches for allowing computer programs and/or other instructions and/or data to be accessed by computer system 1000. Such means, devices, components, instrumentalities or other approaches may include, for example, a removable storage unit 1022 and an interface 1020. Examples of the removable storage unit 1022 and the interface 1020 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1000 may further include a communication or network interface 1024. Communication interface 1024 may enable computer system 1000 to communicate and interact with any combination of external devices, external networks, external entities, etc. (individually and collectively referenced by reference number 1028). For example, communication interface 1024 may allow computer system 1000 to communicate with external or remote devices 1028 over communications path 1026, which may be wired and/or wireless (or a combination thereof), and which may include any combination of LANs, WANs, the Internet, etc. Control logic and/or data may be transmitted to and from computer system 1000 via communication path 1026.

Computer system 1000 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 1000 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 1000 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 1000, main memory 1008, secondary memory 1010, and removable storage units 1018 and 1022, as well as tangible articles of manufacture embodying any combination of the foregoing. Such control logic, when executed by one or more data processing devices (such as computer system 1000), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 10. In particular, embodiments can operate with software, hardware, and/or operating system implementations other than those described herein.

The aspects described herein, and references in the specification to "one aspect," "an aspect," "an exemplary aspect," "an example aspect," etc., indicate that the aspects described can include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is understood that it is within the knowledge of those skilled in the art to effect such feature, structure, or characteristic in connection with other aspects whether or not explicitly described.

Spatially relative terms, such as "beneath," "below," "lower," "above," "on," "upper" and the like, can be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus can be otherwise oriented (rotated 90 degrees or at other orientations) and the spatially relative descriptors used herein can likewise be interpreted accordingly.

The terms "about," "approximately," or the like can be used herein to indicate the value of a given quantity that can vary based on a particular technology. Based on the particular technology, the terms "about," "approximately," or the like can indicate a value of a given quantity that varies within, for example, 10-30% of the value (e.g., +10%, +20%, or +30% of the value).

Aspects of the present disclosure can be implemented in hardware, firmware, software, or any combination thereof. Aspects of the disclosure can also be implemented as instructions stored on a computer-readable medium, which can be read and executed by one or more processors. A machine-readable medium can include any mechanism for storing or transmitting information in a form readable by a machine (e.g., a computing device). For example, a machine-readable medium can include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Furthermore, firmware, software, routines, and/or instructions can be described herein as performing certain actions. However, it should be appreciated that such descriptions are merely for convenience and that such actions result from computing devices, processors, controllers, or other devices executing the firmware, software, routines, instructions, etc. The term "machine-readable medium" can be interchangeable with similar terms, for example, "computer program product," "computer-readable medium," "non-transitory computer-readable medium," or the like. The term "non-transitory" can be used herein to characterize one or more forms of computer readable media except for a transitory, propagating signal.

Additional embodiments can be found in one or more of the following clauses:

1. A viewing device configured to magnify and view a marking on a gemstone, the viewing device comprising:
   a light source configured to generate light directed along a first path to toward the gemstone;
   a mask configured to partially obscures the light from the light source to generate a pattern, wherein the partially obscured light is reflected off the gemstone;
   a magnifying optical device configured to magnify light reflected off the gemstone along a second path; and
   a camera positioned to capture the magnified light such that the pattern is captured by the camera when a table of the gemstone is oriented such that the marking is orientated to be captured by the camera.

2. The viewing device of claim 1, wherein the gemstone is oriented such that the marking is orientated to be captured by the camera when the gemstone is substantially flat.

3. The viewing device of claim 1, wherein the gemstone is substantially flat when light entering the magnifying optical device is substantially normal to the table of the gemstone.

4. The viewing device of claim 1, wherein the light source is coherent.

5. The viewing device of claim 1, wherein the light source is a light emitting diode.

6. The viewing device of claim 1, wherein the first path and second path at least partially overlap extending in at out of the table.

7. The viewing device of claim 6, further comprising an objective lens through which the first and second path overlap; and
   a beam splitter configured to reflect light from the light source along the first path through to toward the gemstone.

8. The viewing device of claim 1, wherein the light source is a first light source, further comprising a second light source that transmits light along a third path that extends through a facet of the gemstone and the second path extends out of the table of the gemstone, the facet different from the table.

9. The viewing device of claim 8, wherein the facet is a first facet of the gemstone, and the viewing device further comprises a third light source configured to generate light directed along a fourth path that extends through a second facet of the gemstone, the second facet being different than the first facet and the table.

10. The viewing device of claim 8, further comprising:
    an actuator to control a direction of the third path;
    a processor coupled to the actuator and at least one camera, the processor configured to analyze an image of the gemstone and, based on the analysis, send signals to the actuator to adjust the direction of the third path.

11. The viewing device of claim 1, wherein the light source is a first light source, and further comprising:
    a second light source, different from the first light source configured to illuminate the gemstone when the camera captures an image of the marking.

12. The viewing device of claim 1, wherein the camera is a first camera, and further comprising:
    a second camera having a wider field of view that the first camera and configured to capture an image of gemstone for coarser adjustment of the gemstone's position and orientation than provided for by the first camera.

13. The viewing device of claim 1, wherein the marking is an inscription.

14. The viewing device of claim 13, wherein the inscription is on the surface of the gemstone.

15. The viewing device of claim 13, wherein the inscription is below the surface of the gemstone.

16. The viewing device of claim 1, wherein the magnifying optical device comprises a lens.

17. The viewing device of claim 1, further comprising:
    a display configured to present an image captured by the camera.

18. The viewing device of claim 17, further comprising:
    a computing device configured to recognize an identifier in the marking.

19. The viewing device of claim 18, wherein the computing device is configured to query a database using the identifier to retrieve data describing the gemstone.

20. The viewing device of claim 19, wherein the data describing the gemstone include a provenance of the gemstone.

21. The viewing device of claim 17, wherein the marking comprises a logo signifying an entity that marked the gemstone.

22. The viewing device of claim 1, wherein the gemstone is mounted on a piece of jewelry, the viewing device further comprising:
    a holder to mount jewelry in an adjustable position and orientation.

Additional embodiments can be found in one or more of the following clauses:

1. A method for focusing a view of a gemstone, the method comprising:
   (a) emitting an aberrated beam onto the gemstone, the aberrated beam having a pattern;
   (b) capturing, with a camera, an image of the aberrated beam reflected off the gemstone;
   (c) applying the captured image to a machine learning model to determine a z-distance of the gemstone; and
   (d) based on the determined z-distance, adjusting a position of the gemstone with respect to the camera.

2. The method of claim 1, wherein the machine learning model is trained using a training set of images of captured aberrated beams with the pattern on other gemstones made of the same material.

3. The method of claim 1, wherein the pattern is a spot pattern.

4. The method of claim 1, further comprising:
   (e) repeating (a)-(c) to target the aberrated beam onto a plurality of positions on a table of the gemstone to determine a plurality of z distances; and (f) based on the plurality of z distances, determining a tilt of the gemstone.

5. The method of claim 4, wherein the gemstone is placed on a sample tray, and further comprises:
(g) based on the a tilt of the gemstone, adjusting an orientation of the sample tray to flatten a table of the gemstone.

6. The method of claim 1, wherein steps (a)-(d) represent a fine focus of the gemstone, further comprising, prior to the fine focus:
(e) coarsely focusing the gemstone with respect to the camera.

7. The method of claim 6, where the image is a first image, and wherein coarsely focusing (e) comprises:
capturing a second image of the gemstone;
applying a Laplacian algorithm to the second image to determine an estimated z-distance of the gemstone; and
based on the estimated z-distance of the gemstone, adjusting a position of the gemstone with respect to the camera.

8. The method of claim 1, wherein the aberrated beam is generated with a laser, further comprising:
(e) increasing a power of the laser; and
(f) after the adjusting (d), emitting light from the laser with increased power to mark the gemstone.

9. The method of claim 8, further comprising:
(g) translating the gemstone into an x-y direction; and
(h) repeating (f)-(g) to inscribe an identifier or logo onto the gemstone.

10. The method of claim 8, wherein the gemstone is situated on a sample tray holding a plurality of gemstones, further comprising:
(e) repeating (a)-(d) for each of the plurality of gemstones.

11. A system for marking and focusing a view of a gemstone, the system comprising:
a laser emitting a laser beam;
a spatial light modulator, wherein the spatial light modulator modifies the laser beam to and from an aberrated laser beam;
a camera, wherein the camera captures an image of the aberrated laser beam reflected from the gemstone;
a stage controller; and
a processor, wherein the processor processes the image captured by the camera.

12. The system of claim 11, wherein the processor applies a Laplacian algorithm to the image captured by the camera to determine a coarse focused z-distance of the gemstone.

13. The system of claim 11, wherein the processor applies a machine learning model to the image captured by the camera to determine a fine focused z-distance of the gemstone.

14. The system of claim 13, wherein the machine learning model is trained using a training set of images of captured aberrated beams with a pattern on other gemstones made of the same material.

15. The system of claim 11, wherein the processor determines a tilt of the gemstone by determining a z-distance of the gemstone for at least three distinct x and y positions of the gemstone.

16. The system of claim 15, wherein the stage controller adjusts the tilt of the gemstone determined by the processor.

17. The system of claim 15, wherein the stage controller adjusts the z-distance of the gemstone determined by the processor.

18. The system of claim 11, wherein the system comprises focusing the gemstone using a coarse focus then focuses the gemstone using a fine focus.

19. The system of claim 11, wherein power of the laser is increased to mark the gemstone after the gemstone is focused.

20. The system of claim 11, wherein the processor provides movement instructions to the stage controller.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A viewing device configured to magnify and view a marking on a gemstone, the viewing device comprising:
a first light source configured to generate light directed along a first path toward the gemstone;
a mask configured to partially obscure the light from the first light source to generate a pattern, wherein the partially obscured light is reflected off the gemstone;
a magnifying optical device configured to magnify light reflected off the gemstone along a second path;
a camera positioned to capture the magnified light such that the pattern is captured by the camera when a table of the gemstone is oriented such that the marking is orientated to be captured by the camera;
a second light source configured to transmit light along a third path that extends through a facet of the gemstone and wherein the second path extends out of the table, the facet different from the table;
at least one actuator configured to control a direction of the third path; and
a processor coupled to the at least one actuator and at least one camera, the processor configured to analyze an image of the gemstone and, based on the analysis, send signals to the at least one actuator to adjust the direction of the third path.

2. The viewing device of claim 1, wherein the gemstone is oriented such that the marking is orientated to be captured by the camera when the gemstone is substantially flat.

3. The viewing device of claim 1, wherein the gemstone is substantially flat when light entering the magnifying optical device is substantially normal to the table.

4. The viewing device of claim 1, wherein the first light source or the second light source is coherent.

5. The viewing device of claim 1, wherein the first light source or the second light source is a light emitting diode.

6. The viewing device of claim 1, wherein the first path and the second path at least partially overlap extending in and out of the table.

7. The viewing device of claim 6, further comprising:
an objective lens through which the first path and the second path overlap; and
a beam splitter configured to reflect light from the first light source along the first path toward the gemstone.

8. The viewing device of claim 1, wherein the facet is a first facet of the gemstone, and the viewing device further comprises a third light source configured to generate light directed along a fourth path that extends through a second facet of the gemstone, the second facet being different than the first facet and the table.

9. The viewing device of claim 1, wherein
the first light source is configured to illuminate the gemstone when the camera captures an image of the marking.

10. The viewing device of claim 1, wherein the camera is a first camera, and further comprises:
a second camera having a wider field of view than the first camera and configured to capture an image of the gemstone for coarser adjustment of a position and orientation of the gemstone than that provided for by the first camera.

11. The viewing device of claim 1, wherein the marking is an inscription.

12. The viewing device of claim 11, wherein the inscription is on the surface of the gemstone.

13. The viewing device of claim 11, wherein the inscription is below the surface of the gemstone.

14. The viewing device of claim 1, wherein the magnifying optical device comprises a lens.

15. The viewing device of claim 1, further comprising:
a display configured to present an image captured by the camera.

16. The viewing device of claim 1, wherein the mask can be from a projection from a digital programmable display.

17. The viewing device of claim 15, further comprising:
a computing device configured to recognize an identifier in the marking.

18. The viewing device of claim 9, wherein the computing device is configured to query a database using the identifier to retrieve data describing the gemstone.

19. The viewing device of claim 18, wherein the data describing the gemstone include a provenance of the gemstone.

20. The viewing device of claim 15, wherein the marking comprises a logo signifying an entity that marked the gemstone.

21. The viewing device of claim 1, wherein the gemstone is mounted on a piece of jewelry, the viewing device further comprising:
a holder to mount the jewelry in an adjustable position and orientation.

22. A viewing device configured to magnify and view a marking on a gemstone, the viewing device comprising:
a first light source configured to generate light directed along a first path toward the gemstone;
a mask configured to partially obscure the light from the first light source to generate a pattern, wherein the partially obscured light is reflected off the gemstone;
a magnifying optical device configured to magnify light reflected off the gemstone along a second path;
a camera positioned to capture the magnified light such that the pattern is captured by the camera when a table of the gemstone is oriented such that the marking is orientated to be captured by the camera;
a second light source configured to transmit light along a third path that extends through a first facet of the gemstone and wherein the second path extends out of the table, the first facet different from the table; and
a third light source configured to generate light directed along a fourth path that extends through a second facet of the gemstone, the second facet being different than the first facet and the table.

23. A viewing device configured to magnify and view a marking on a gemstone, the viewing device comprising:
a first light source configured to generate light directed along a first path toward the gemstone;
a mask configured to partially obscure the light from the first light source to generate a pattern, wherein the partially obscured light is reflected off the gemstone;
a magnifying optical device configured to magnify light reflected off the gemstone along a second path;
a first camera positioned to capture the magnified light such that the pattern is captured by the camera when a table of the gemstone is oriented such that the marking is orientated to be captured by the camera; and
a second camera having a wider field of view than the first camera and configured to capture an image of the gemstone for coarser adjustment of a position and orientation of the gemstone than that provided for by the first camera.

* * * * *

UNITED STATES PATENT AND TRADEMARK OFFICE
CERTIFICATE OF CORRECTION

PATENT NO. : 12,072,295 B1
APPLICATION NO. : 18/513086
DATED : August 27, 2024
INVENTOR(S) : Henley et al.

Page 1 of 1

It is certified that error appears in the above-identified patent and that said Letters Patent is hereby corrected as shown below:

In the Claims

In Column 22, Claim 18, Line 4, delete "claim 9," and insert -- claim 17, --, therefor.

Signed and Sealed this
Third Day of June, 2025

Coke Morgan Stewart
*Acting Director of the United States Patent and Trademark Office*